US012586589B2

(12) United States Patent
Sandrew

(10) Patent No.: US 12,586,589 B2
(45) Date of Patent: Mar. 24, 2026

(54) ARTIFICIAL INTELLIGENCE SYSTEM THAT GENERATES QUESTIONS AND EVALUATES ORAL READINGS AND RESPONSES

(71) Applicant: SANDREW & COMPANY, LLC, Encinitas, CA (US)

(72) Inventor: Barry Sandrew, Encinitas, CA (US)

(73) Assignee: SOCRATIC METRIC, LLC, Irvine, CA (US)

( * ) Notice: Subject to any disclaimer, the term of this patent is extended or adjusted under 35 U.S.C. 154(b) by 0 days.

(21) Appl. No.: 19/358,403

(22) Filed: Oct. 14, 2025

(65) Prior Publication Data

US 2026/0038509 A1 Feb. 5, 2026

Related U.S. Application Data

(63) Continuation-in-part of application No. PCT/US2024/005037, filed on Oct. 8, 2024, which is a continuation of application No. 18/908,209, filed on Oct. 7, 2024, now Pat. No. 12,211,511, which is a continuation-in-part of application No. 18/669,998,
(Continued)

(51) Int. Cl.
| | |
|---|---|
| *G10L 17/22* | (2013.01) |
| *G06F 3/16* | (2006.01) |
| *G06F 40/58* | (2020.01) |
| *G06V 20/50* | (2022.01) |

(Continued)

(52) U.S. Cl.
CPC .............. *G10L 17/22* (2013.01); *G06F 3/167* (2013.01); *G06F 40/58* (2020.01); *G06V 20/50* (2022.01); *G10L 13/02* (2013.01); *G10L 17/14* (2013.01)

(58) Field of Classification Search
CPC ......... G10L 17/22; G10L 13/02; G10L 17/14; G06F 40/58; G06F 3/167; G06V 20/50
See application file for complete search history.

(56) References Cited

U.S. PATENT DOCUMENTS

| | | | |
|---|---|---|---|
| 11,990,139 B1 | 5/2024 | Sandrew | |
| 2014/0205974 A1* | 7/2014 | Pellom .................. | G10L 15/197 434/157 |
| 2023/0068338 A1* | 3/2023 | Ramnani ................ | G06F 40/35 |

OTHER PUBLICATIONS

International Search Report and Written Opinion issued in PCT/US2024/050377 on Nov. 13, 2024.

* cited by examiner

*Primary Examiner* — Andrew C Flanders
*Assistant Examiner* — Edward Tracy, Jr.
(74) *Attorney, Agent, or Firm* — ARC IP Law, PC; Joseph J. Mayo

(57) ABSTRACT

An artificial intelligence system that conducts an oral question-and-answer session with a single respondent to achieve an educational outcome, such as reviewing material to reinforce ideas or to prepare the respondent for future tests or events, or evaluating the respondent's knowledge or communication skills. The system may use an artificial intelligence engine that can understand and generate natural language, such as a large-language model like ChatGPT™. The system may require the respondent to read questions aloud, and it may evaluate the respondent's oral articulation and provide feedback on the articulation. Similarly, the respondent may be required to read the response to the question aloud. The system may generate feedback on the response and also require the respondent to read this feedback aloud. Reading all the material aloud leverages the production effect to reinforce learning and retention.

23 Claims, 15 Drawing Sheets

Related U.S. Application Data filed on May 21, 2024, now Pat. No. 12,165,655, which is a continuation of application No. 18/483, 078, filed on Oct. 9, 2023, now Pat. No. 11,990,139.

(51) Int. Cl.
  *G10L 13/02*          (2013.01)
  *G10L 17/14*          (2013.01)

FIG. 1E

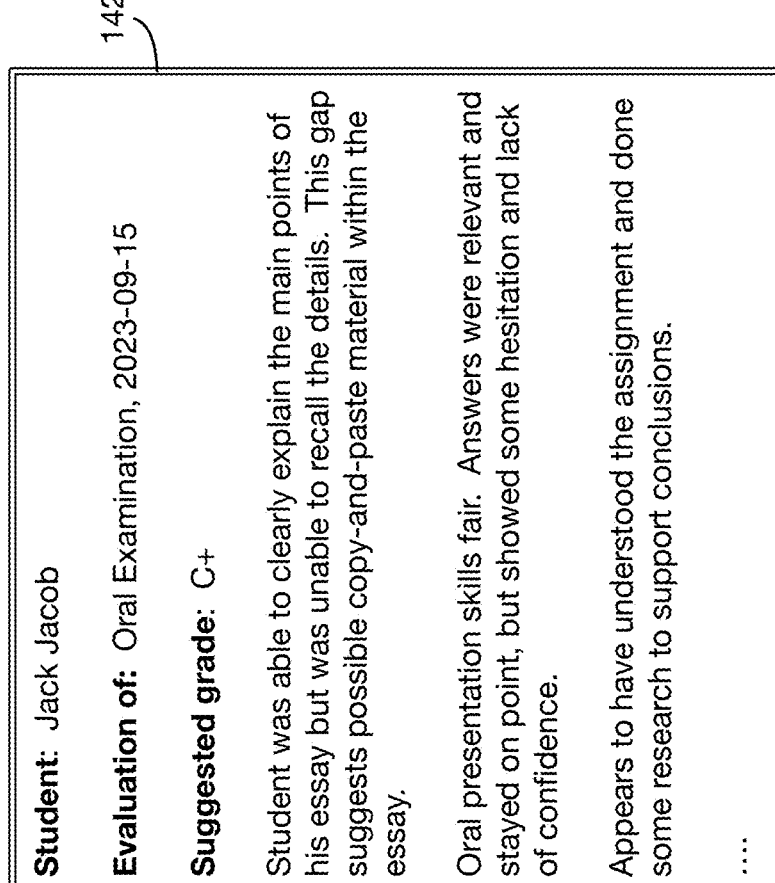

Student: Jack Jacob

Evaluation of: Oral Examination, 2023-09-15

Suggested grade: C+

Student was able to clearly explain the main points of his essay but was unable to recall the details. This gap suggests possible copy-and-paste material within the essay.

Oral presentation skills fair. Answers were relevant and stayed on point, but showed some hesitation and lack of confidence.

Appears to have understood the assignment and done some research to support conclusions.

.....

142

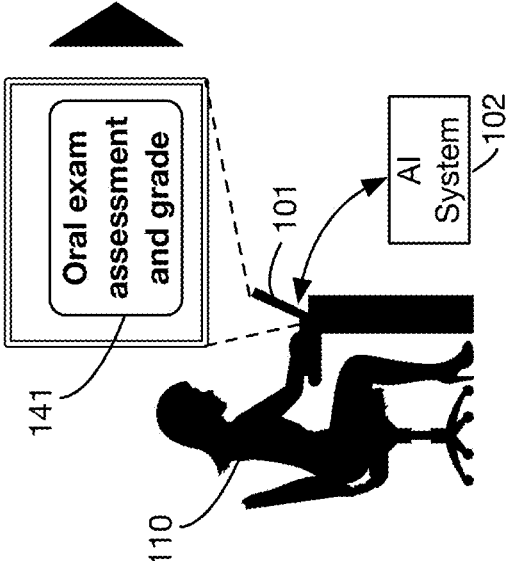

Oral exam assessment and grade

141

AI System

Figure 1F:
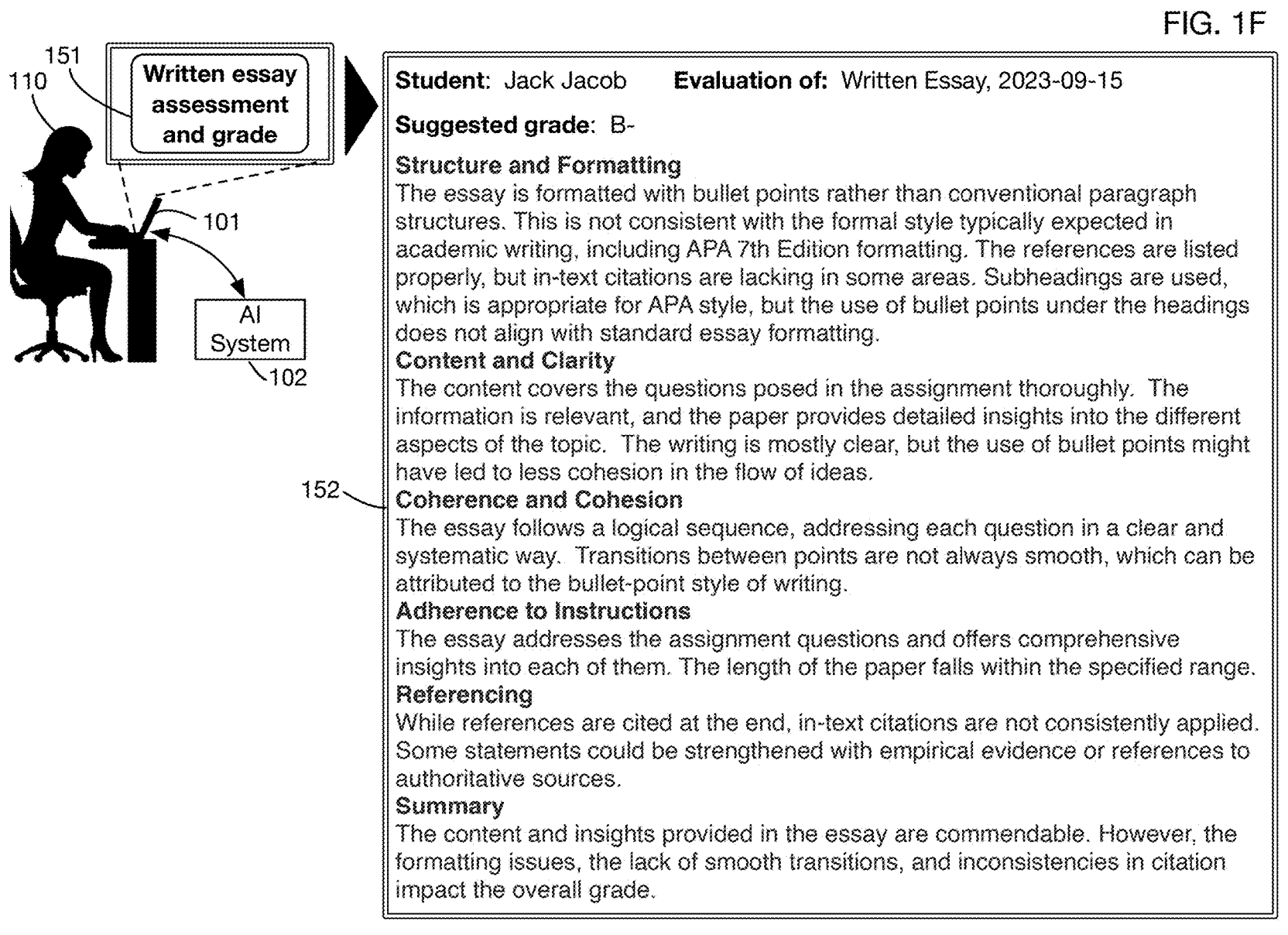

Written essay assessment and grade — 151

110

101

AI System — 102

152

Student: Jack Jacob     Evaluation of: Written Essay, 2023-09-15

Suggested grade: B-

Structure and Formatting

The essay is formatted with bullet points rather than conventional paragraph structures. This is not consistent with the formal style typically expected in academic writing, including APA 7th Edition formatting. The references are listed properly, but in-text citations are lacking in some areas. Subheadings are used, which is appropriate for APA style, but the use of bullet points under the headings does not align with standard essay formatting.

Content and Clarity

The content covers the questions posed in the assignment thoroughly. The information is relevant, and the paper provides detailed insights into the different aspects of the topic. The writing is mostly clear, but the use of bullet points might have led to less cohesion in the flow of ideas.

Coherence and Cohesion

The essay follows a logical sequence, addressing each question in a clear and systematic way. Transitions between points are not always smooth, which can be attributed to the bullet-point style of writing.

Adherence to Instructions

The essay addresses the assignment questions and offers comprehensive insights into each of them. The length of the paper falls within the specified range.

Referencing

While references are cited at the end, in-text citations are not consistently applied. Some statements could be strengthened with empirical evidence or references to authoritative sources.

Summary

The content and insights provided in the essay are commendable. However, the formatting issues, the lack of smooth transitions, and inconsistencies in citation impact the overall grade.

FIG. 2D

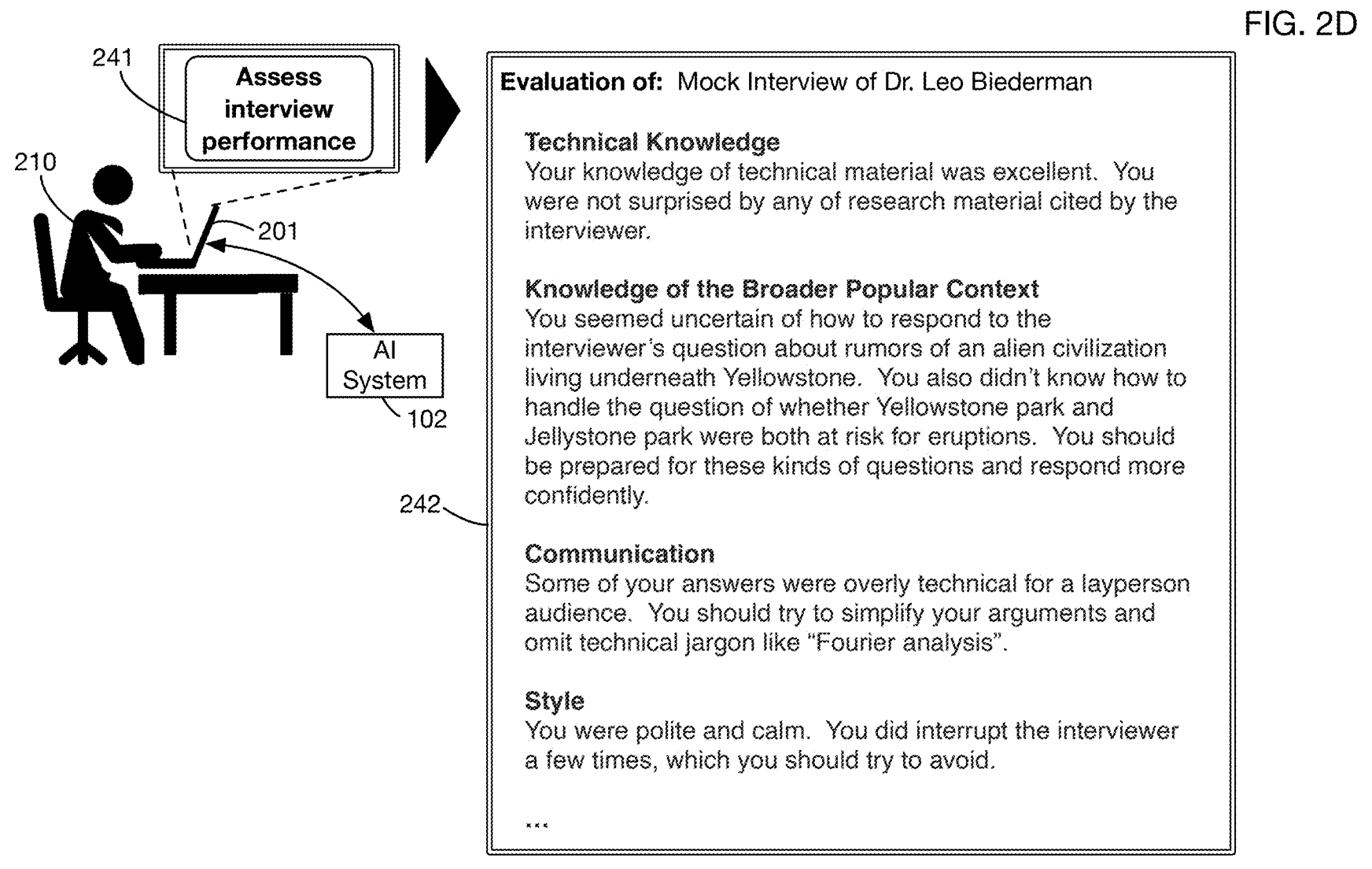

Evaluation of: Mock Interview of Dr. Leo Biederman

Technical Knowledge
Your knowledge of technical material was excellent. You were not surprised by any of research material cited by the interviewer.

Knowledge of the Broader Popular Context
You seemed uncertain of how to respond to the interviewer's question about rumors of an alien civilization living underneath Yellowstone. You also didn't know how to handle the question of whether Yellowstone park and Jellystone park were both at risk for eruptions. You should be prepared for these kinds of questions and respond more confidently.

Communication
Some of your answers were overly technical for a layperson audience. You should try to simplify your arguments and omit technical jargon like "Fourier analysis".

Style
You were polite and calm. You did interrupt the interviewer a few times, which you should try to avoid.

...

Assess interview performance

241

210

201

AI System

102

242

ARTIFICIAL INTELLIGENCE SYSTEM THAT GENERATES QUESTIONS AND EVALUATES ORAL READINGS AND RESPONSES

This application is a continuation-in-part of International Application No. PCT/US2024/05037, filed 8 Oct. 2024, which claims the priority of U.S. Utility patent application Ser. No. 18/908,209, filed 7 Oct. 2024, which is a continuation-in-part of U.S. Utility patent application Ser. No. 18/669,998, filed 21 May 2024, which is a continuation of U.S. Utility patent application Ser. No. 18/483,078, filed 9 Oct. 2023, the specifications of which are hereby incorporated herein by reference.

BACKGROUND OF THE INVENTION

Field of the Invention

One or more embodiments of the invention are related to the field of information processing. More particularly, but not by way of limitation, one or more embodiments of the invention enable an artificial intelligence system that generates questions and evaluates oral readings and responses, for example based on defined data sets.

Description of the Related Art

Chatbots and similar systems are available for general text-based discussions with users. Recently artificial intelligence engines like ChatGPT™ have been integrated into these systems to improve language understanding and to provide more complete responses due to pretraining on very large data sets. These systems have several limitations that prevent them from being fully effective educational tools, or otherwise for conducting dialogs in general, i.e., to ensure a user's comprehension of a topic, for use in generating dialogs for depositions, etc.

First, known systems typically interact with one user at a time. Second, most AI systems require that users interact using text, which requires the users to use an input device to type and to read a screen to see responses. Third, the discussions with a chatbot are focused on general topics rather than on specific objectives including educational objectives for example or for reviewing or reinforcing material that a person desires to gain a command over. Fourth, discussions with a chatbot are unmoderated, providing no role for a teacher in guiding discussion. Fifth, existing systems simply respond to input and do not evaluate the quality of the responses from discussion participants.

Moreover, students and other users are increasingly using generative AI ("GenAI") to create or research responses to questions. As a result, discussion questions, a staple of educational assessment for centuries, have lost their validity and usefulness in assessing student learning outcomes and building a sense of community for several reasons: (1) Erosion of Authenticity: GenAI tools can easily generate responses to discussion questions that mimic human thought and comprehension. This makes it difficult to discern whether a student's response reflects their own understanding and critical thinking or is merely a well-crafted output from an AI. The authenticity of student engagement, a key aspect of learning, is compromised. (2) Superficial Engagement: The ease with which students can use GenAI to produce responses may lead to more superficial engagement with the material. Instead of deeply reflecting on the content and engaging in meaningful discourse, students might rely on AI-generated answers that don't truly capture their personal insights or grasp of the subject matter. (3) Difficulty in Assessing Critical Thinking: Traditional discussion questions are designed to gauge students' critical thinking and ability to synthesize information. However, GenAI can produce seemingly well-reasoned arguments without true understanding. This undermines the ability of educators to accurately assess a student's cognitive development through discussions. (4) Loss of Community Building: The use of AI-generated responses can weaken or negate a sense of community that discussion forums aim to build. When students rely on AI rather than engaging personally, the interaction becomes less genuine, reducing the opportunity for peer-to-peer learning and the development of a supportive academic community. (5) Increased Risk of Plagiarism: With GenAI, the line between original thought and plagiarism becomes blurred. Students might use AI to craft responses that are too similar to existing content, whether intentionally or unintentionally, leading to academic integrity concerns and diminishing the educational value of discussion questions. (6) Ineffectiveness in Assessing Learning Outcomes: Discussion questions have traditionally been a tool to measure how well students understand and apply course concepts. However, if responses can be easily generated by AI without genuine student input, the effectiveness of this tool in assessing true learning outcomes is greatly diminished.

Given these challenges, organizations need to rethink how they use discussion questions in the GenAI era, for example by incorporating new methods that encourage authentic engagement and provide a more accurate assessment of learning. One technique that increases engagement, learning, and retention is to require students to speak aloud the material they are trying to learn, which has been shown to improve learning; existing systems generally communicate with students using text, rather than spoken words, which does not exploit this method of learning.

For at least the limitations described above there is a need for an artificial intelligence system that generates questions and evaluates oral readings and responses while conducting oral question-and-answer sessions, including educational dialogs, deposition dialogs, thesis defense practice or any other scenario involving asking questions to test the recall and comprehension of curated reference data.

BRIEF SUMMARY OF THE INVENTION

One or more embodiments of the invention may enable an artificial intelligence system that generates questions and evaluates oral readings and responses. Specifically, one or more embodiments of the invention may use an artificial intelligence (AI) engine to guide, facilitate, conduct, and evaluate a dialog between the AI engine and one or more participants. A dialog may be used for example to test a participant's understanding of a subject or of a particular text or output, including the participant's own output. A dialog may be used to explain a subject to one or more participants using a Socratic method of questions and answers, where the questions may be provided by the AI engine. A dialog may be used to help a participant review material and prepare for example for an interview or a subsequent examination, such as a thesis defense. A dialog may for example include an oral examination to confirm that students have written their own essays and have not simply copied-and-pasted material or used an AI system to write their essays, or to verify that they at least understand the material even if they did copy other sources. A dialog managed by the system may have multiple participants, and the system may generate questions and topics to guide interaction between the participants. Dialogs conducted by the system may be used for example for any type of education in any type of school, or in any professional or personal setting. The education provided by the system-conducted dialog may be an initial exposure to material, or it may be a review of material the participant has previously seen or created.

In one or more embodiments, in a first scenario, a teacher uses an embodiment of the system to conduct oral examinations of students to test and reinforce their understanding of written essays they have submitted. In a second scenario, a researcher uses an embodiment of the system to conduct a mock interview to prepare him for an upcoming real interview; this mock interview educates the researcher on the types of questions to expect, and it allows him to review the relevant material that may be mentioned during the interview. The first scenario involves dialogs with multiple participants as well as a moderator (the teacher) who may control (and participate in) the dialogs. The second scenario generates a dialog between the system and a single person (the researcher) without a separate moderator. Embodiments of the invention may generate and conduct dialogs with any number of participants, with or without a moderator.

In the first scenario, students write and submit an essay on an assigned topic, and the system then guides, facilitates, and evaluates oral examinations of the students based on their essays and on other course materials. Embodiments generally utilize initial preparation steps that are performed prior to obtaining student written essays and conducting oral examinations. For example, a teacher uses a computer system equipped with software (which may be a web-based interface, for example) that guides collection of dialog context information that will be used to generate subsequent discussions with students. Some of this information may be entered by the teacher, and some may be obtained directly from other data sources such as class logs, transcribed class lectures, YouTube® videos or class document repositories. In one embodiment a dialog context is related to a specific assignment that may include reading assigned material and then writing an essay on a specified topic. One or more embodiments may be used in conjunction with any student assignment or assignments, which may include for example, without limitation, readings, experiments, discussions, written essays, tests, videos and individual or group projects.

The dialog context may include a rubric for the course, or for any portion of the course. This rubric may for example describe the course syllabus, the learning outcomes desired for the course, the methods of evaluation that will be used, and the criteria that will be applied to these evaluations. A context may include instructions for one or more reading assignments, and the text of any or all of these readings. These reading assignments may be specifically related to the written assignment, or they may be general reading assignments for the course. The context may include instructions for a writing assignment; the example for this scenario is instructions for a written essay that students are to submit prior to oral examination. For the writing assignment, the context may include suggested literature and references that may be used for the writing assignment. An assignment context may also include any videos or other media that have been assigned for the students to review, transcripts or recordings of past lectures and class notes provided with these lectures, and anticipated learning outcomes for the assignment or for the course overall. These materials shown for dialog context are illustrative; one or more embodiments may use any information related to a course, to an assignment, to student background and knowledge, or to general knowledge in a field of study as part of a dialog context.

One or more embodiments may utilize a computer specifically coded to implement embodiments of the invention detailed herein and may have a data collection user interface that enables entry of some or all of the data. For example, for each element of the context there may be one or more screens that enable data entry or selection or drag-and-drop of relevant files including selected URLs. Some or all of the data may be collected automatically by the computer. In one or more embodiments, some or all of the data may be entered or selected by persons other than teacher, such as teaching assistants, staff, administrators, or students themselves. In one or more embodiments there may be multiple computers that collect data.

In one or more embodiments students prepare and submit their written essays in response to assignment instructions. These essays may be transmitted by students directly to the system or may be collected by teacher who enters them into the system. Each essay may be tagged with the associated student's name. The essays may be transmitted to the AI system.

When the AI system has received dialog context materials, and student essays, then based on these inputs, and on any other information accessible to the AI system, the AI system may then generate questions or interactive discussions for a dialog that test students' knowledge of the material. This dialog may also be used to verify that a student wrote his or her own essay or at least understands the content of that essay. The teacher may moderate this process using interactive controls via the computer. For example, the teacher may use a selection screen to select a student or a group of students for an oral examination. The AI system may then generate a specific initial question for the selected student, based on that student's essay and on the other contextual materials. In one or more embodiments, each student may state the student's name or other identifying information so that the answers are associated with that particular student. In at least one embodiment, each student's voice fingerprint (or signature) may be stored in any memory within the system including in the Cloud and utilized to later associate answers with that particular student, i.e., when capturing classroom voice audio. In multi-student scenarios, the system can provide evaluation of the class as a whole including knowledge of subject matter and critical thinking skills and degree of participation, i.e., for any or each student and the class as a whole.

In one or more embodiments the teacher may also enter comments into the system while or after the student responds. The AI system may then generate follow-up questions to guide the student through a dialog and may receive and process responses to these follow-up questions. At each step the AI system may use any available information, including dialog context information and the previous questions and responses, to generate the next portion of the dialog. This dialog between the student and the AI system may continue until the AI system determines that it has sufficiently tested the student's knowledge and capabilities, or until the teacher makes this determination.

In one or more embodiments, the AI system may guide conversations that involve multiple students and potentially the teacher as well. The system may generate questions that are directed to specific students, or general questions or topics for conversation that apply to all of the participants. If the system has received voice samples from the students, it may recognize which student is speaking at any time, or if the teacher is speaking. (If student voice fingerprints are not available, the teacher may for example call on students by name or ask students to identify themselves by name when speaking. The system may then associate responses with the correct students. The system may monitor the teacher's voice continuously throughout a discussion session and analyze the teacher's comments to identify which student is speaking at any moment.) In an illustrative use case, the teacher may relate one student's work to another student's work by selecting both students and indicating that the AI system should generate questions directed to each student that compare and contrast the content of the two student's essays. Each spoken input from each participant may be converted to text, translated if necessary, tagged with the speaker's identity, and input into the AI system.

In one or more embodiments, any or all of the participants (students and teacher) may be at different locations, and communication may occur network links using audio or video communication tools. Audio input and output may be available at each location, and the AI system may transmit audio to these locations and receive audio from these locations. The audio from a video communication might also be transcribed and assessed forensically.

When a student's oral examination is finished, the teacher may use an input control to ask the AI system to generate an assessment of the student's performance, and potentially to calculate a grade. The AI device might perform such an assessment automatically once it has determined the student has completed the answer to the best of their ability. The assessment may be based on the student's oral responses as well as the student's written essay or other output. The system may be configured to provide assessments in specific areas, such as: ability to summarize the main points and arguments of the reading and essay in a clear and concise manner; ability to explain the relevance and significance of the reading and essay to the course topic or theme; ability to critically analyze and evaluate the strengths and weaknesses of the reading and essay, using evidence and examples to support their claims; ability to synthesize and integrate the ideas from the reading and essay with other sources of information, such as lectures, discussions, or research; ability to apply the concepts and theories from the reading and essay to real-world situations or problems, demonstrating their creativity and problem-solving skills; ability to communicate their thoughts and opinions effectively, using appropriate language, tone, and style for the oral exam context. The teacher may define any other or additional criteria or guidelines for assessment. The AI system may correlate the student's oral responses with the student's written essay to make a determination of whether the student appears to have written original material or instead has plagiarized, copy-and-pasted, or generated all or part of the essay using generative AI. An important issue is whether the user has met the expected outcome, i.e., they understand the material and can use it in novel situations.

In one or more embodiments, the AI system may also be used to evaluate and grade students' written essays or other student output. The AI system may generate this assessment using all of the available information, including the dialog context, the student's essay, other students' essays (for comparative evaluation and grading, for example), and any criteria the teacher or others have specified for evaluating the written assignment. The assessment may include a grade as well as specific comments in areas either selected by the AI system or specified in advance. In one or more embodiments the assessment of the oral examination and the assessment of the written assignment may be combined or cross-referenced.

In a second scenario the dialog conducted by the system is with a single participant who wants to use the dialog to prepare for a future interview. For example, a researcher writes and publishes a paper. A local newspaper publishes an article on the researcher and his latest paper, and a television station makes a request to the researcher for an interview to discuss the topic. The researcher decides that he needs to prepare and practice for the upcoming interview, and he wants to use the AI system to generate a dialog between him and the system to practice with a mock interview. This scenario could also be utilized for practicing for or conducting depositions for example: the AI system could take the position of the opposing attorney, and the instructions and rubric may be configured to assess the client's performance such as the client's ability to be concise and honest but to say no more than required and to stay away from topics that may be damaging to the case. In either case, the user creates a dialog context with relevant background information, and this context is transmitted to the AI system. The researcher may enter context information using his own computer, or he may instruct the system to collect the relevant data from any sources. In this scenario, the dialog context may include for example, without limitation: background information on the person or organization who will be giving the interview; any topics provided in advance by the interviewer; the article published by the researcher that led to the interview; the newspaper article or any other commentaries that have been made on the researcher's article, wherein the article may include images or drawings that are interpreted by the AI engine in addition to text (as is possible with Google Gemini™ for example); the researcher's other research such as articles, books, lectures, videos; research by others on the same or similar topics; general background information on the topic or field of study; questions the researcher anticipates may be asked by the interviewer; and transcripts or videos of other interviews performed by the interviewer or the interviewer's organization. These components of the dialog context are illustrative; the researcher or other staff may provide any desired information to the AI system to prepare the system for an upcoming dialog.

In this example, a user has a dialog with the AI system, for example in the format of a mock interview to simulate his upcoming television interview. Again, this embodiment could be applied to mock depositions or provide questions for depositions in real time using the context provided by an attorney, patent agent or paralegal. As an illustrative setup, the researcher may use his computer, equipped with a speaker and microphone, as the "interviewer". The computer may be coupled to AI system (or computer 201 may host all or part of the AI system). The AI system may generate questions and process the response, to generate follow-up question and response. This exchange may continue until the AI system, or the user/researcher determine that the mock interview is complete or sufficient. In some situations, the output from the AI system may be displayed as text for the researcher to read, instead of or in addition to as audio output; similarly in some situations the researcher may type his responses instead of or in addition to providing audio responses. Any form of communication between a dialog participant and the AI system may be supported in one or more embodiments of the invention.

After the mock interview is over, the user may ask the AI system to generate an assessment of his performance in the interview. An example assessment may provide feedback on the user's preparedness and knowledge, and on his communication skills and style, organized around topics selected by the AI system or by the researcher himself.

Embodiments of the invention may also be used for other situations that require a dialog that is dependent on a specific context, not just a general context available with current chat bots. Embodiments of the invention apply to any situation where there is a requirement to prove knowledge and understanding of a select population of documents, videos, graphs, images, recorded lectures, etc.

One or more embodiments of the invention may enable a system that conducts and evaluates oral question-and-answer sessions using artificial intelligence. The system may include an artificial intelligence engine that includes a processor and a large language model. It may include a text-to-speech converter coupled to the AI engine, and a speech-to-text converter coupled to the AI engine. It may include a data collection user interface. The user interface may accept session information that describes a Q&A session to be held between the AI engine and a respondent; the session information may include a dialog context, and one or more questioning types. The data collection user interface may transmit this session information to the AI engine. The AI engine may be configured to receive the session information, and to generate text questions for the respondent based on the session information and on previous responses of the respondent. The session information may be received and entered into the data collection user interface prior to the Q&A session. The session information may include information that is configured to be received from one or more of a user other than the respondent, and other data sources other than the respondent. The AI engine may transmit the text questions to the text-to-speech converter, which may be configured to transform the text questions to audio questions and output the audio questions to the respondent. The speech-to-text converter may be configured to receive audio responses from the respondent, transform them to text responses, and transmit the text responses to the AI engine. The AI engine may be further configured to generate one or more evaluations based on the text responses and the session information, and to transmit these evaluations to the respondent.

In one or more embodiments, the one or more questioning types may include one or more of adaptive questioning, additive questioning, and hypothetical questioning.

In one or more embodiments, the session information may also include a session introduction, and the AI engine may be configured to transmit the session introduction to the respondent at the beginning of the question-and-answer session.

In one or more embodiments, the dialog context may include one or more of written output generated by said respondent; a course rubric; assignment instructions; class notes; class lectures; anticipated learning outcomes; and background information on a topic.

In one or more embodiments, the text-to-speech converter may translate text questions into a preferred language of the respondent, and the speech-to-text converter may translate text responses from the preferred language of the respondent.

In one or more embodiments, the system may also include an image interpreter coupled with or within the AI engine. The image interpreter may be configured to obtain an image and to update the dialog context based on this image.

In one or more embodiments, the system may also have a database, and the AI engine may be further configured to store the text questions, the text responses, and the evaluations in the database. In one or more embodiments the AI engine may also store the amount of time the respondent takes to generate each of the audio responses in the database.

In one or more embodiments, when the AI engine receives a text response corresponding to a text question, it may ask the respondent if the respondent wants to make another attempt to answer the text question. When the respondent generates multiple responses to a text question, the AI engine may ask the respondent to select the best response of these multiple responses, and it may then generate an evaluation of the best response.

One or more embodiments of the invention may include an AI engine with a processor and a large language model, and a data collection user interface that accepts session information describing a question-and-answer session to be held between the AI engine and a respondent and transmits this session information to the AI engine. Session information may be received and entered into the data collection user interface prior to the question-and-answer session. Session information may be received from one or more of: a user other than respondent, and other data sources other than respondent. The AI engine may be configured to receive the session information and generate a text question for the respondent based on the session information and on previous responses of the respondent. It may transmit the text question to the respondent. It may receive an audio reading of the text question from the respondent, generate an evaluation of articulation quality of the audio reading of the text question, and transmit the evaluation of articulation quality of the audio reading of the text question to the respondent. It may receive an audio response to the text question from the respondent, generate response feedback based on the audio response and on the session information, and transmit the response feedback to the respondent. It may receive an audio reading of the response feedback from the respondent, generate an evaluation of articulation quality of the audio reading of the response feedback, and transmit the evaluation of articulation quality of the audio reading of the response feedback to the respondent.

In one or more embodiments, when the articulation quality of the audio reading of the text question is below a threshold, the AI engine may prompt the respondent to repeat the audio reading of the text question. In one or more embodiments, when the articulation quality of the audio reading of the response feedback is below a threshold, the AI engine may prompt the respondent to repeat the audio reading of the response feedback.

BRIEF DESCRIPTION OF THE DRAWINGS

The above and other aspects, features and advantages of the invention will be more apparent from the following more particular description thereof, presented in conjunction with the following drawings wherein:

FIGS. 1A through 1F show a first illustrative scenario where an embodiment of the invention is used to process students' written essays and to conduct and then evaluate oral exams of each student based on the student's written essay.

FIG. 1A shows context information for the assignment being entered into the system.

FIG. 1B shows the students' written essays being entered into the system.

FIG. 1C shows the teacher selecting a student and the system generating an initial oral question for the student to test his understanding of the assignment and of his writeup.

FIG. 1D shows a continued dialog between the student and the system, as the system interprets the student's responses and asks follow-up questions.

FIG. 1E shows the system grading and assessing the student's performance on his oral exam.

FIG. 1F shows the system grading and assessing a student's written essay.

FIGS. 2A through 2D show a second illustrative scenario where an embodiment of the invention is used to prepare a researcher for an interview to discuss his recent publication.

FIG. 2A shows the scenario that leads to the interview: a researcher publishes a paper; an article on his paper is published in a newspaper; and a television station schedules an interview with the researcher to discuss his work.

FIG. 2B shows the researcher collecting context information and entering this information into the artificial intelligence system to be used in a mock interview to prepare the researcher for the television interview.

FIG. 2C shows the system conducting a mock interview with the researcher.

FIG. 2D shows the researcher asking the system to evaluate his performance in the mock interview.

DETAILED DESCRIPTION OF THE INVENTION

Figures 1A, 1B:
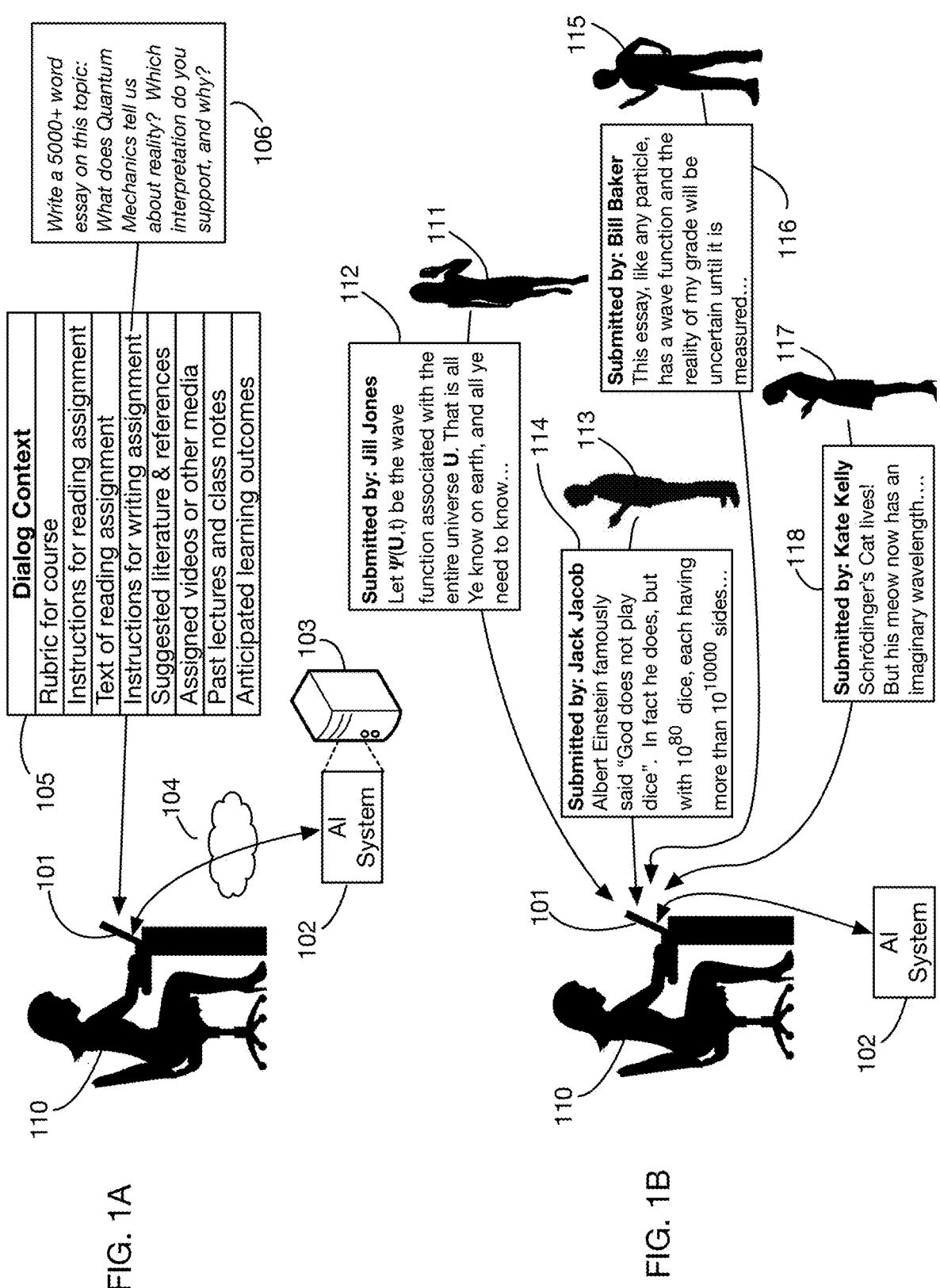

An artificial intelligence system that generates questions and evaluates oral readings and responses will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention may use an artificial intelligence (AI) engine to guide, facilitate, conduct, and evaluate a dialog between the AI engine and one or more participants. A dialog may be used for example to test a participant's understanding of a subject or of a particular text or output, including the participant's own output. A dialog may be used to explain a subject to one or more participants using a Socratic method of questions and answers, where the questions may be provided by the AI engine. A dialog may be used to help a participant review material and prepare for example for an interview or a subsequent examination, such as a thesis defense or a deposition. A dialog may for example include an oral examination to confirm that students have written their own essays and have not simply copied-and-pasted material or used an AI system to write their essays, or to verify that they at least understand the material even if they did copy other sources. A dialog managed by the system may have multiple participants, and the system may generate questions and topics to guide interaction between the participants. Dialogs conducted by the system may be used for example for any type of education in any type of school, or in any professional or personal setting. The education provided by the system-conducted dialog may be an initial exposure to material, or it may be a review of material the participant has previously seen or created.

This specification shows two illustrative scenarios for use of embodiments of the system to conduct dialogs. In the first scenario shown in FIGS. 1A through 1F, a teacher uses an embodiment of the system to conduct oral examinations of students to test and reinforce their understanding of written essays they have submitted. In the second scenario shown in FIGS. 2A through 2D, a researcher uses an embodiment of the system to conduct a mock interview to prepare him for an upcoming real interview; this mock interview educates the researcher on the types of questions to expect, and it allows him to review the relevant material that may be mentioned during the interview. The first scenario involves dialogs with multiple participants as well as a moderator (the teacher) who may control (and participate in) the dialogs. The second scenario generates a dialog between the system and a single person (the researcher) without a separate moderator. Embodiments of the invention may generate and conduct dialogs with any number of participants, with or without a moderator.

FIGS. 1A through 1F show the first illustrative scenario for use of an embodiment of the invention. In this scenario, students write and submit an essay on an assigned topic, and the system then guides, facilitates, and evaluates oral examinations of the students based on their essays and on other course materials. The steps shown in this scenario are illustrative; one or more embodiments of the invention may enable any subset or combination of these steps in any order and may enable any additional steps related to generation of dialogs to assess or improve student performance.

FIG. 1A shows initial preparation steps performed prior to obtaining student written essays and conducting oral examinations. A teacher 110 uses a computer system 101 equipped with software (which may be a web-based interface, for example) that guides collection of dialog context information 105 that will be used to generate subsequent discussions with students. Some of this information may be entered by teacher 110, and some may be obtained directly from other data sources such as class logs or class document repositories. In this example the dialog context 105 is related to a specific assignment that may include reading assigned material and then writing an essay on a specified topic. One or more embodiments may be used in conjunction with any student assignment or assignments, which may include for example, without limitation, readings, experiments, discussions, written essays, tests, videos and individual or group projects.

The dialog context 105 may include a rubric for the course, or for any portion of the course. This rubric may for example describe the course syllabus, the learning outcomes desired for the course, the methods of evaluation that will be used, and the criteria that will be applied to these evaluations. Context 105 may include instructions for one or more reading assignments, and the text of any or all of these readings. These reading assignments may be specifically related to the written assignment, or they may be general reading assignments for the course. Context 105 may include instructions for a writing assignment; the example for this scenario is instructions 106 for a written essay that students are to submit prior to oral examination. For the writing assignment 106, the context 105 may include suggested literature and references that may be used for the writing assignment. Assignment context 105 may also include any videos or other media that have been assigned for the students to review, transcripts or recordings of past lectures and class notes provided with these lectures, and anticipated learning outcomes for the assignment or for the course overall. These materials shown for dialog context 105 are illustrative; one or more embodiments may use any information related to a course, to an assignment, to student background and knowledge, or to general knowledge in a field of study as part of a dialog context.

Computer 101 may have a data collection user interface that enables entry of some or all of the data 105. For example, for each element of the context 105 there may be one or more screens that enable data entry or selection or drag-and-drop of relevant files. Some or all of the data may be collected automatically by computer 101. In one or more embodiments, some or all of the data may be entered or selected by persons other than teacher 110, such as teaching assistants, staff, administrators, or students themselves. In one or more embodiments there may be multiple computers 101 that collect data 105.

Information 105 may be transmitted to an artificial intelligence (AI) system 102 for use in subsequent steps as shown in FIGS. 1B through 1F. This AI system may execute on one or more separate computers or processors 103 that are connected to the user computer 101 via a network interface 104, or part or all of the AI system may execute on the user computer 101. AI system 102 may incorporate for example a large language model (LLM), and it may enable analysis of human language input and generation of human language output in response to queries. Illustrative AI systems that may be used in one or more embodiments include ChatGPT™, Google Bard™ and Google Gemini™. AI system 102 may also enable input of data other than human language, such as images, audio, or videos, and generation of media other than text, one embodiment utilized Google Gemini™, ChatGPT4o or other existing or future AI models to process text, images, audio, and any other type of media. The AI system may include or be coupled to modules or alternatively converters that convert audio speech input into text, and that generate spoken output. It may also include or be connected to language translation modules or converters. In one or more embodiments the AI system may have been trained specifically on the subject matter of the course. The AI system may be guided with prompts that indicate the type of inputs the system should analyze and the type of outputs it should generate.

Computers 101 and 103 may be any type or types of computers or processors, including for example, without limitation, laptops, tablets, phones, desktop computers, server computers, CPUs, GPUs, ASICs, or any network or combination of any of these devices. Each of the systems 101 and 103 may include multiple computers. In one or more embodiments the computers 101 and 103 may be the same hardware or may share hardware. Network links 104 may use any type or types of wired or wireless networks, including local networks and global networks such as the Internet. Software functions may be distributed in any desired manner across processors.

FIG. 1B continues the illustrative scenario of FIG. 1A. Four illustrative students 111, 113, 115, and 117 prepare and submit their written essays 112, 114, 116, and 118, respectively, in response to assignment instructions 106. These essays may be transmitted by students directly to system 101 (or system 103) or may be collected by teacher 110 who enters them into the system. Each essay may be tagged with the associated student's name. The essays may be transmitted to the AI system 102.

In one or more embodiments of the invention, any type of student output in response to an assignment may be input into the system, including but not limited to essays. For example, student output may include, without limitation: written texts of any length and format; responses to test questions that may be in any format such as multiple choice, true/false, fill in blank, or written response; lab notebooks; projects that may include images, audio, video, or text; numerical, mathematical, or symbolic answers, derivations, or calculations; computer programs; musical compositions; or artworks of any form. The scenario shown in FIGS. 1A through 1F uses the example of essays as student output, but similar processing and functionality may be applied to any other type of student output.

Figures 1C, 1D:
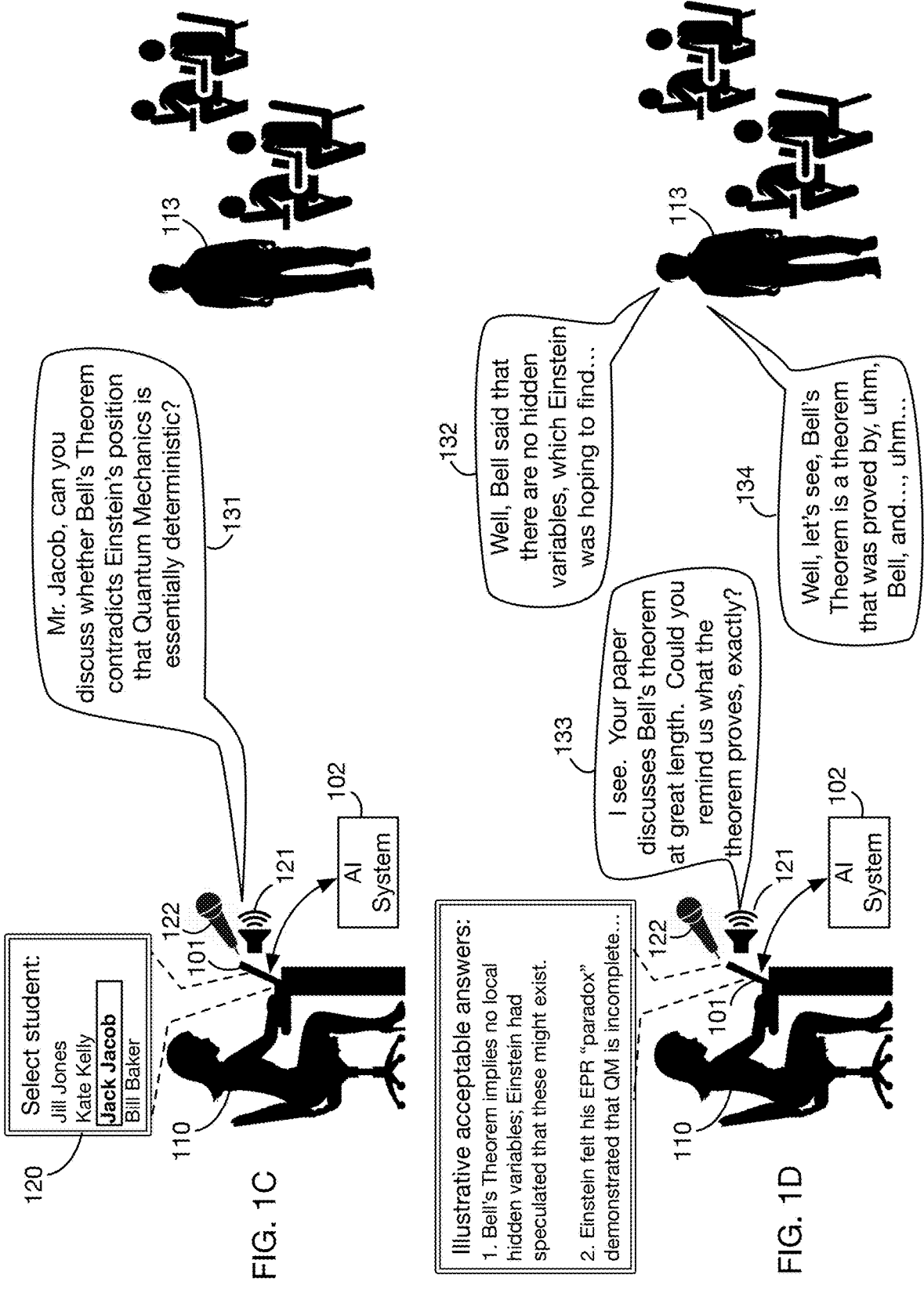

FIG. 1C continues the scenario of FIGS. 1A and 1B. AI system 102 has received dialog context materials 105, and student essays 112, 114, 116, and 118. Based on these inputs, and on any other information accessible to the AI system, the AI system may then generate questions or interactive discussions for a dialog that test students' knowledge of the material. This dialog may also be used to verify that a student wrote his or her own essay or at least understands the content of that essay. Teacher 110 may moderate this process using interactive controls via computer 101. For example, the teacher may use a selection screen 120 to select a student or a group of students for an oral examination. AI system 102 may then generate a specific initial question 131 for the selected student 113, based on that student's essay and on the other contextual materials. In one or more embodiments, the AI system or the computer 101 may be coupled to a speech output module or converter that speaks the question 131 through a speaker 121. In some situations, the AI system may generate question 131 in textual form and the teacher may speak the question. A mixture of teacher speaking, guided by the AI system output, and direct audio output from the computer may be used in one or more embodiments. Teacher 110 may for example turn on or off the automated audio output using dialog controls on computer 110. In one or more embodiments, the AI system may include or may be coupled to language translation modules or converters and information about each student's preferred language may be entered into the system; question 131 and other system responses to the student may then be generated in the student's preferred language. In one or more embodiments, the teacher or each student may state the student's name or other identifying information so that the answers are associated with that particular student. In at least one embodiment, each student's voice fingerprint may be stored in any memory within the system including in the Cloud and utilized to later associate answers with that particular student, i.e., when capturing classroom voice audio. In multi-student scenarios, the system can provide evaluation of the class as a whole including knowledge of subject matter and critical thinking skills and degree of participation, i.e., for any or each student and the class as a whole. In one or more embodiments, a teacher may ask a question to the entire class or single out a student by name. If a student answers, then either a voice signature for that student can be used to identify that student or in other embodiments the teacher or student may identify who is talking by name. The full class approach can result in a large amount of processing, so the system may be used forensically after class. In this scenario, the lesson or lecture may be processed by one or more embodiments of the system to provide a critique of the lesson or lecture, provide questions and class discussions based on the curation of all relevant course content as well as an assessment of each student's participation. In embodiments that use voice fingerprints, an application may simply have each student read a phrase and record it so that the various tones and overtones of the voice can be utilized to create a voice fingerprint.

Continuing to FIG. 1D, selected student 113 may make response 132 to question 131. In one or more embodiments the system may be coupled to a microphone 122, and audio of response 132 received by the microphone may be transmitted to the AI system 102. The AI system may contain or be coupled to a speech-to-text module or alternatively converter that transforms the student's spoken response 132 to text. It may also contain or be coupled to language translation modules or alternatively converters that can understand the student's response 132 in various languages. It might also obtain samples of the student's accent and subsequently learn how to interpret said accent. The same would apply for students with disabilities that make their oral responses difficult to interpret. A sufficient sample of their oral behavior would teach the AI to properly interpret the oral responses. In one or more embodiments, the system may receive one or more voice samples from each student before that student's oral examination; these voice samples may be used to improve speech recognition and also to identify the speaker when multiple students are engaging in a conversation. An illustrative method for obtaining voice samples is to ask each student to read a specific section of text at the beginning of the student's oral exam, if a sample for that student has not been previously provided. In addition, AI system 102 may time the student's answers and if thresholds are not met, may downgrade or lower the points associated with a particular question for example. In one or more embodiments the number of questions is of a fixed number and the answers are evaluated, which may be performed by a student asserting a "answer complete" button if for example using an app on a mobile device or other computer. The course rubric may be utilized to provide a grade to the student, in their preferred language.

In one or more embodiments the teacher 110 may also enter comments into the system while or after the student responds. AI system 102 may then generate follow-up questions such as question 133 to guide the student through a dialog and may receive and process responses 134 to these follow-up questions. At each step the AI system 102 may use any available information, including dialog context information 105 and the previous questions and responses, to generate the next portion of the dialog. This dialog between the student and the AI system may continue until the AI system determines that it has sufficiently tested the student's knowledge and capabilities, or until teacher 110 makes this determination. Teacher 110 may enter any additional instructions or comments at any time, which may also be transmitted to the AI system as input to the continuing dialog with the student. At any point in the dialog, AI system 102 may generate additional questions or other output using any of the inputs received, including the assignment context 105, the student's essay 114, the student's previous responses to questions, and input from the teacher 110.

In one or more embodiments, the AI system may guide conversations that involve multiple students and potentially the teacher as well. The system may generate questions that are directed to specific students, or general questions or topics for conversation that apply to all of the participants. If the system has received voice samples from the students, it may recognize which student is speaking at any time, or if the teacher is speaking. In an illustrative use case, the teacher may relate one student's work to another student's work by selecting both students and indicating that the AI system should generate questions directed to each student that compare and contrast the content of the two student's essays. Each spoken input from each participant may be converted to text, translated if necessary, tagged with the speaker's identity, and input into the AI system.

In one or more embodiments, any or all of the participants (students and teacher) may be at different locations, and communication may occur network links using audio or video communication tools. Audio input 122 and output 121 may be available at each location, and AI system 102 may transmit audio to these locations and receive audio from these locations.

Continuing the scenario in FIG. 1E, when a student's oral examination is finished, teacher 110 may use an input control 141 to ask AI system 102 to generate an assessment of the student's performance, and potentially to calculate a grade. Output 142 from the AI system may contain any types of comments or assessments, qualitative or quantitative. The assessment 142 may be based on the student's oral responses as well as the student's written essay or other output. The system may be configured to provide assessments in specific areas, such as: ability to summarize the main points and arguments of the reading and essay in a clear and concise manner; ability to explain the relevance and significance of the reading and essay to the course topic or theme; ability to critically analyze and evaluate the strengths and weaknesses of the reading and essay, using evidence and examples to support their claims; ability to synthesize and integrate the ideas from the reading and essay with other sources of information, such as lectures, discussions, or research; ability to apply the concepts and theories from the reading and essay to real-world situations or problems, demonstrating their creativity and problem-solving skills; ability to communicate their thoughts and opinions effectively, using appropriate language, tone, and style for the oral exam context. Teacher 110 may define any other or additional criteria or guidelines for assessment. The AI system may correlate the student's oral responses with the student's written essay to make a determination of whether the student appears to have written original material or instead has plagiarized, copy-and-pasted, or generated all or part of the essay using generative AI. An important issue is whether the user has met the expected outcome, i.e., they understand the material and can use it in novel situations. Embodiments of the invention may be utilized for one-on-one dialogues, classroom settings, pre-recorded class assessment and student solo assessment. Although the first two scenarios are covered in depth herein, the pre-recorded class assessment uses speech-to-text conversion to monitor lectures and student participation based on a pre-recorded lecture. Thus, the system does not generate real-time questions, but rather assesses learning outcomes and pedagogical performance post session. In the latter embodiment, an app can be utilized to output questions to the student and sample the mobile device that the student is using to determine if a webpage is being utilized to seek answers or listen to the student to see if the student is asking someone or some other app for answers or is heard typing on a separate keyboard for example. The app can also prevent students from using copy and paste to copy information from other sources (or to copy previous questions or answers) and to input this copied information as responses to the app. It can record and analyze all the keystrokes and gestures input by the student during the session on the device on which the app is running, to determine if the student is accessing other information sources (such as opening another window and accessing AI assistants or search engines). In this way, cheating becomes more difficult.

In at least one embodiment, the AI system or artificial intelligence engine permits the respondent to provide multiple oral responses to a given text question. For example, in one or more embodiments, the AI system or artificial intelligence engine prompts the respondent to select a best response among the multiple oral responses and generates the evaluation based only on the best response. In a least one embodiment, the AI system or the artificial intelligence engine stores all responses in a database and produces a composite evaluation incorporating iterative improvements across the responses. In one or more embodiments, the AI system or the artificial intelligence engine records in a database: each text question; each oral response; each evaluation; and a measure of elapsed time between delivery of the each text question and receipt of the each oral response.

In one or more embodiments, aid database enables forensic assessment of authenticity of responses and longitudinal tracking of learning outcomes. In at least one embodiment, the AI system or the artificial intelligence engine stores and compares voice biometrics of the respondent across multiple sessions to verify identity. In at least one embodiment, the voice biometrics is utilized to detect potential AI-generated voice substitution or deepfake audio during the question-and-answer session. In one or more embodiments, the AI system or artificial intelligence engine enables forensic analysis including detecting anomalous articulation patterns inconsistent with previously stored voiceprints of the respondent. In at least one embodiment, the forensic analysis includes detecting a reading level of the respondent and adjusting a difficulty level of the text question.

In one or more embodiments, the AI system or the artificial intelligence engine is generates oral questions in a manner that prevents substitution of responses generated by external generative AI systems, thereby authenticating that the responses originate from the respondent. In at least one embodiment, the session information includes explicit contrast with text-based discussion questions, whereby oral articulation requirements provide resistance to AI-assisted plagiarism or substitution.

In one or more embodiments, the AI system may also be used to evaluate and grade students' written essays or other student output. This capability is illustrated in FIG. 1F, which continues the scenario of FIGS. 1A through 1E. Teacher 110 uses control 151 to generate an assessment 152 of the student's written essay. The AI system 102 may generate this assessment 152 using all of the available information, including the dialog context, the student's essay, other students' essays (for comparative evaluation and grading, for example), and any criteria the teacher or others have specified for evaluating the written assignment. The assessment 152 may include a grade as well as specific comments in areas either selected by the AI system or specified in advance. In one or more embodiments the assessment 142 of the oral examination and the assessment 152 of the written assignment may be combined or cross-referenced.

Figure 2A:
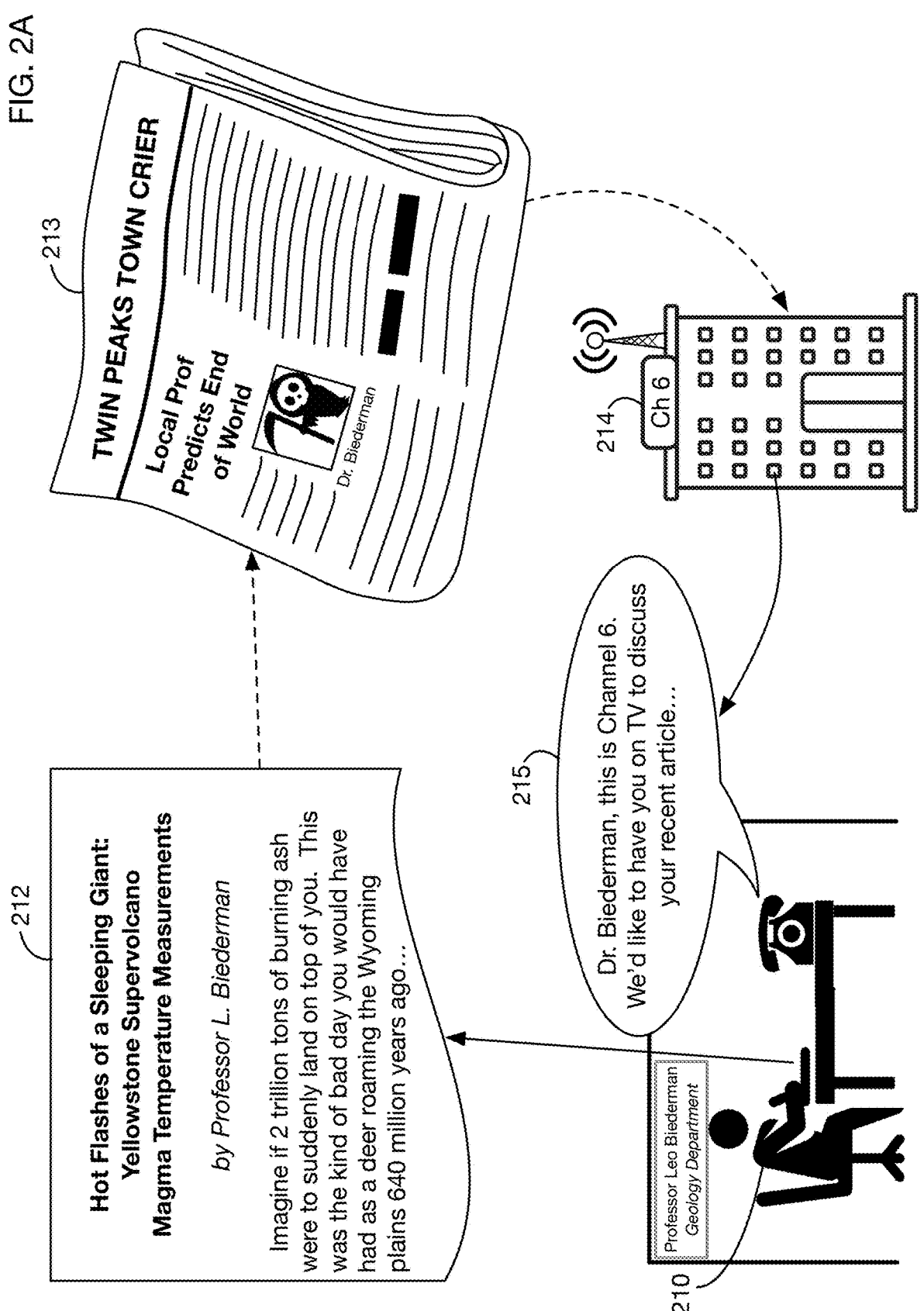
Figure 2B:
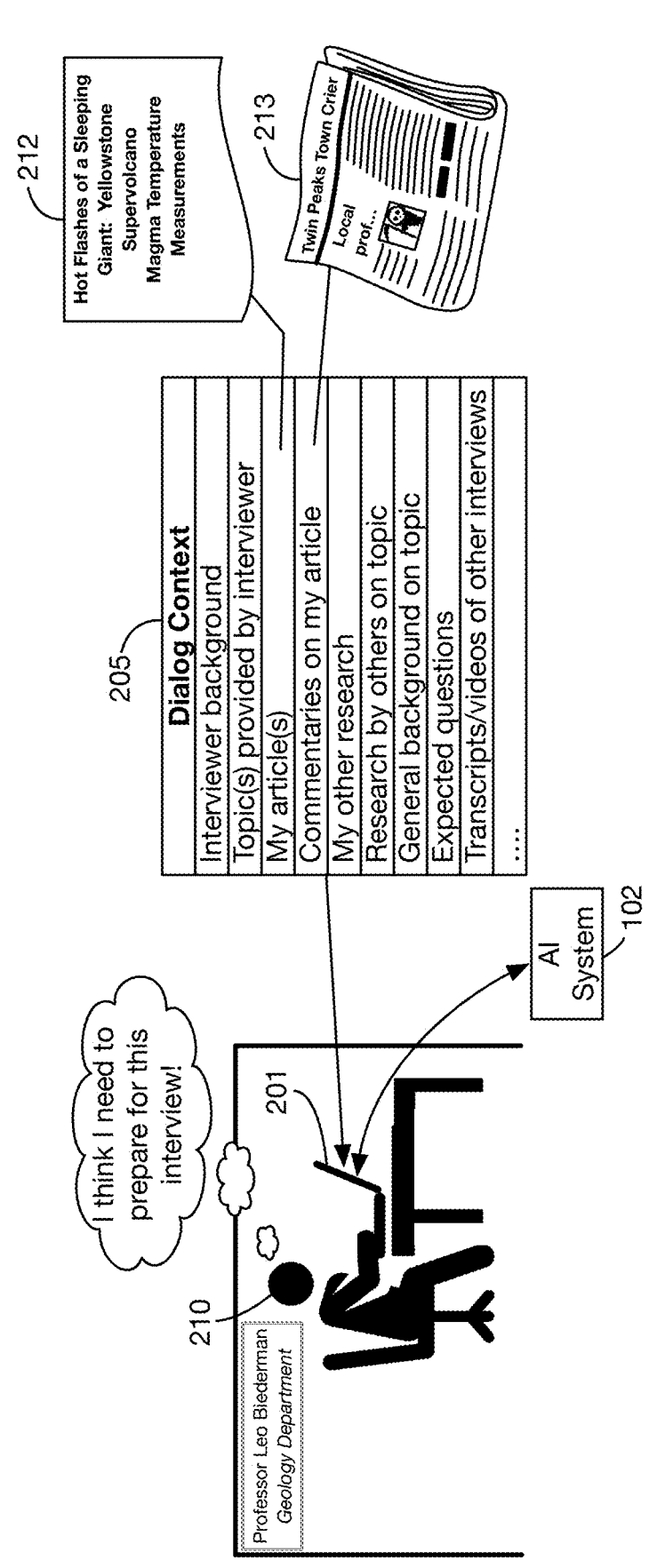

FIGS. 2A through 2D show a second illustrative scenario for use of an embodiment of the invention. In this scenario the dialog conducted by the system is with a single participant who wants to use the dialog to prepare for a future interview. FIG. 2A shows the background for this scenario. A researcher 210 writes and publishes a paper 212. A local newspaper 213 publishes an article on the researcher and his latest paper, and a television station 214 makes a request 215 to the researcher for an interview to discuss the topic. Continuing in FIG. 2B, the researcher decides that he needs to prepare and practice for the upcoming interview, and he wants to use AI system 102 to generate a dialog between him and the system to practice with a mock interview. He creates dialog context 205 with relevant background information, and this context is transmitted to AI system 102. The researcher may enter context information using his own computer 201, or he may instruct the system to collect the relevant data from any sources. In this scenario, dialog context 205 may include for example, without limitation: background information on the person or organization who will be giving the interview; any topics provided in advance by the interviewer; the article 212 published by the researcher that led to the interview; the newspaper article 213 or any other commentaries that have been made on the researcher's article, wherein the article may include images or drawings that are interpreted by the AI engine in addition to text (as is possible with Google Gemini™ for example); the researcher's other research such as articles, books, lectures, videos; research by others on the same or similar topics; general background information on the topic or field of study; questions the researcher anticipates may be asked by the interviewer; and transcripts or videos of other interviews performed by the interviewer or the interviewer's organization. These components of the dialog context 205 are illustrative; the researcher 210 or other staff may provide any desired information to AI system 102 to prepare the system for an upcoming dialog.

Figure 2C:
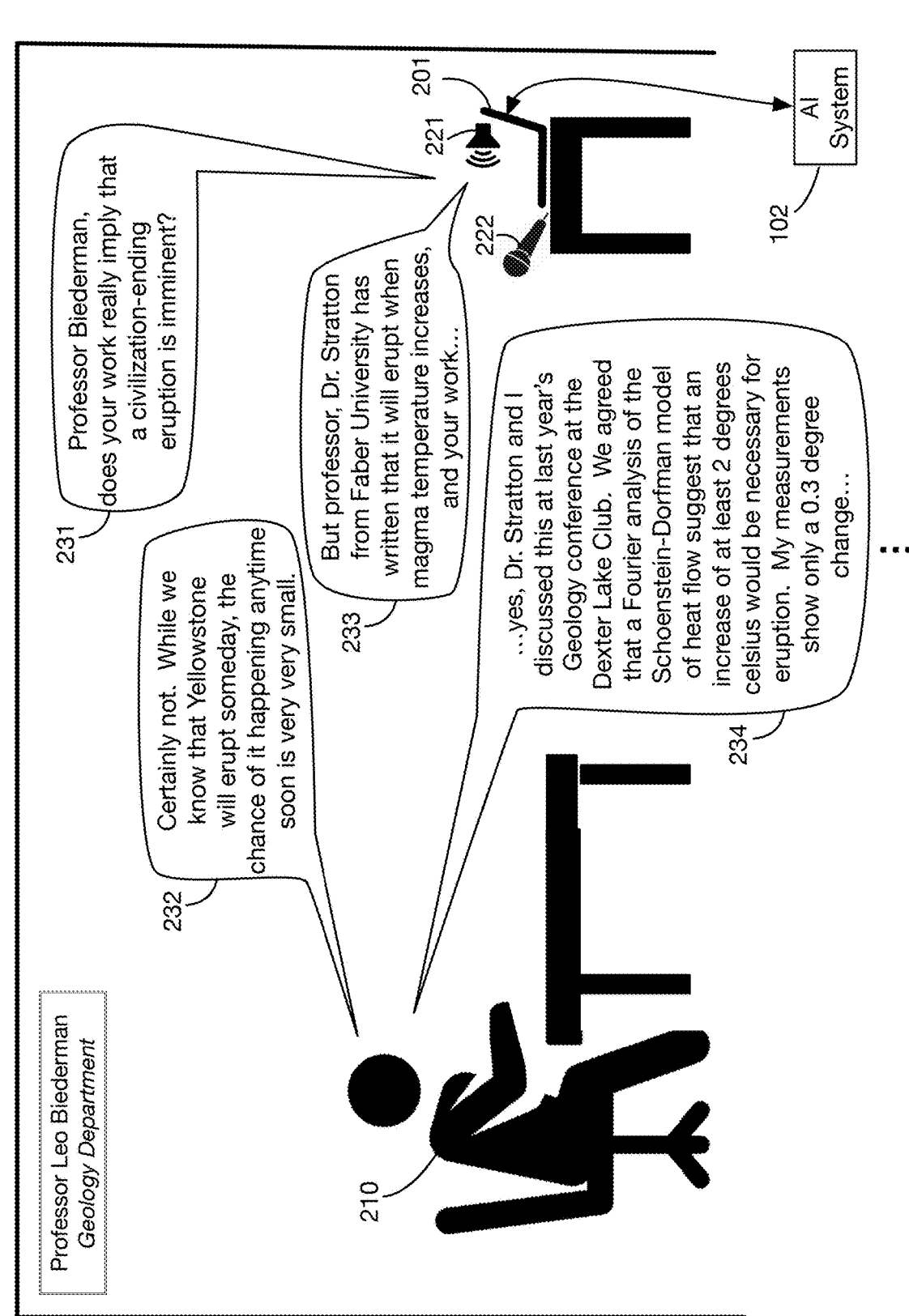

In FIG. 2C, researcher 210 has a dialog with AI system 102, in the format of a mock interview to simulate his upcoming television interview. As an illustrative setup, the researcher may use his computer 201, equipped with a speaker 221 and microphone 222, as the "interviewer". Computer 201 may be coupled to AI system 102 (or computer 201 may host all or part of the AI system). The AI system may generate questions such as 231, and process the response 232, to generate follow-up question 233 and response 234. This exchange may continue until the AI system or the researcher determine that the mock interview is complete or sufficient. In some situations, the output from the AI system may be displayed as text for the researcher to read, instead of or in addition to as audio output; similarly in some situations the researcher may type his responses instead of or in addition to providing audio responses. Any form of communication between a dialog participant and the AI system may be supported in one or more embodiments of the invention.

In FIG. 2D, after the mock interview is over, researcher 210 uses control 241 to ask AI system 102 to generate an assessment 242 of his performance in the interview. Illustrative assessment 242 may for example provide feedback on the researcher's preparedness and knowledge, and on his communication skills and style, organized around topics selected by the AI system or by the researcher himself.

The two scenarios presented in FIGS. 1A through 1F and in FIGS. 2A through 2D show illustrative dialogs; one or more embodiments of the invention may use an AI engine to plan, organize, conduct, moderate, or evaluate any type of dialog that educates any participant or participants on any selected topic or topics. Dialogs may or may not have one or more moderators, such as a teacher. Dialogs may be based on any contextual information, such as background information on the topic or topics of discussion, and output generated by dialog participants. The AI engine may learn additional context as a dialog proceeds in order to ask relevant follow-up questions based on participants' previous responses.

Figure 3:
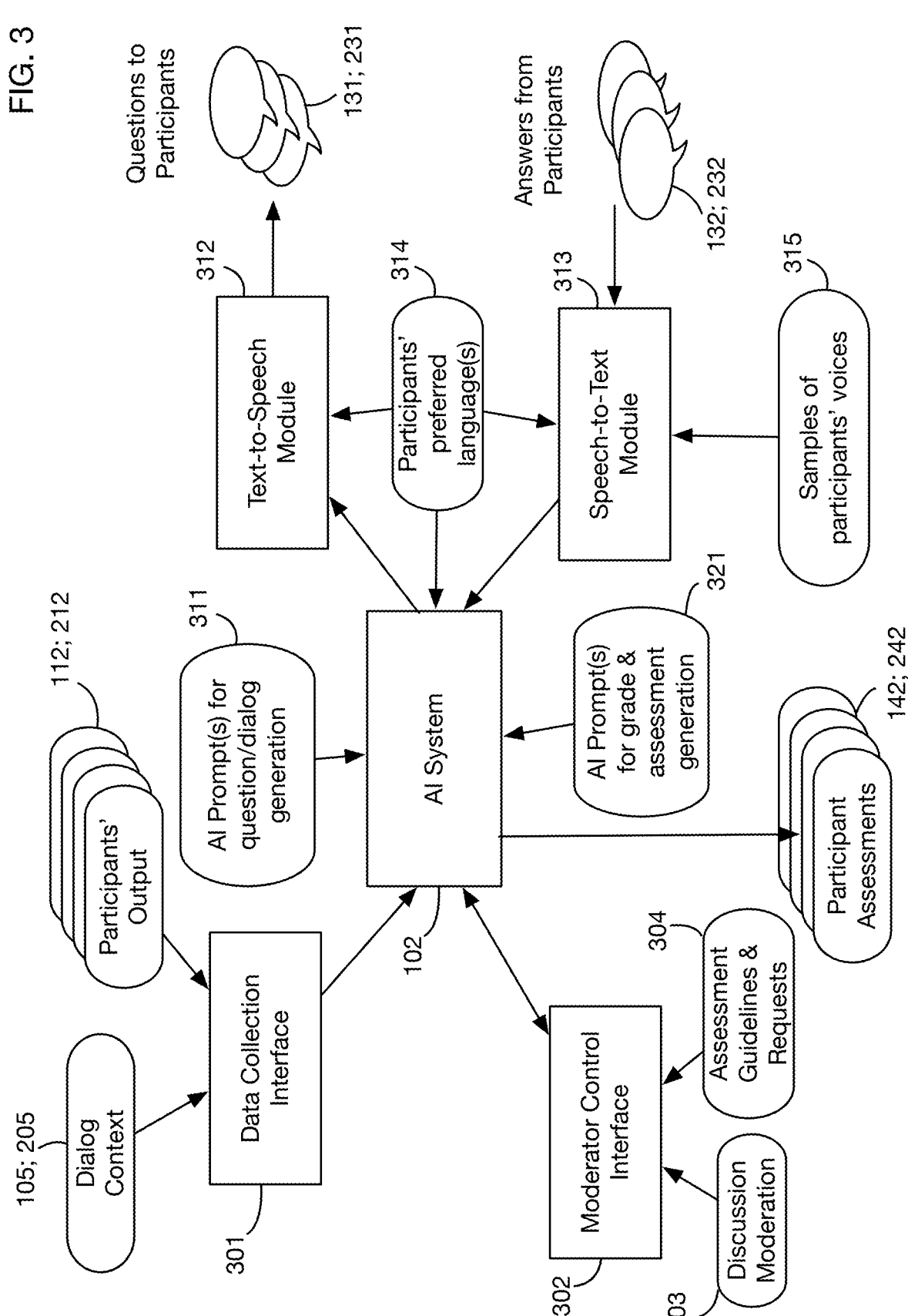
FIG. 3 shows an architectural block diagram of an illustrative embodiment of the system.

FIG. 3 shows an architectural diagram of illustrative components of one or more embodiments of the invention. AI system 102 may be any component or components that creates output in response to inputs and control prompts. It may be for example a generative system such as any variation or type of GPT (generative pre-trained transformers), which may for example include any type of LLM (large language model). The system may include one or more prompts 311 to AI system 102 for the generation of dialog questions or topics, and one or more prompts 321 to the AI system for the generation of assessments of the participants' performance or of other outputs. The system may include a data collection interface 301 through which dialog context information may be entered or obtained, and through which output generated by the participants may be input. One or more embodiments of data collection interface 301 may include an image interpreter that is configured to understand images and update dialog context based on the interpreted images. One or more embodiments may include the interpreter within the AI system 102, i.e., for example Google Gemini™. Illustrative dialog contexts include context 105 for the first scenario of student oral exams, and context 205 for the second scenario of a mock interview of a researcher. Illustrative output from participants includes essay 112 from a student in the first scenario, and published research paper 212 from a researcher in the second scenario.

The system may also include a moderator control interface 302 that a moderator may use to guide the processes that use the AI system 102 to generate output such as dialog questions and assessments. Some dialogs may not have a moderator. In some situations a moderator may also be a participant in the dialog. Moderator inputs may include inputs 303 to moderate discussions during dialogs, such as selection of which participant or participants should participate in the next portion of a dialog, and input on whether a dialog session should conclude. Moderator inputs may also include inputs 304 to control when assessments should be generated and to define or suggest criteria and guidelines for these assessments.

AI system 102 may also include or be coupled to a text-to-speech module 312 and a speech-to-text module 313. Modules as used throughout may alternatively be implemented as non-transitory source code in the memory of a computer specifically coded to perform a given function. These modules may be configured with the preferred languages of the participants 314, and they may include translation capabilities to understand various languages and to convert between a native language of the AI system and the languages of the participants. The text-to-speech module 312 may be used to generate spoken questions (such as 131 in scenario one and 231 in scenario two) given to participants during dialogs, and the speech-to-text module 313 may be used to receive and comprehend participants' answers (such as 132 in scenario one and 232 in scenario two). Samples 315 of the voices of each participant may be input into the voice-to-text module 313 so that this module can identify the speaker.

The modules and subsystems shown in FIG. 3 are illustrative; embodiments of the invention may contain any subset of these modules, or additional capabilities. The modules may be implemented in software or hardware or a combination thereof. They may be distributed in any manner across different processors, including for example a client computer used by a moderator and one or more server computers that host the AI system 102. Modules may be combined or organized in any desired manner.

Embodiments of the invention may also be used for doctoral thesis defense and depositions in litigation. This invention applies to any situation where there is a requirement to prove knowledge and understanding of a select population of documents, videos, graphs, images, recorded lectures, etc. Embodiments may be implemented as an SAAS system that utilizes the cloud to utilize any type of media including text and videos (URLs from video websites and elsewhere), URLs of research articles and journal articles as well as the lay press. Embodiments may also utilize entire textbooks or chapters via an encryption from the publisher when the printed info has copyright protection.

One or more embodiments of the invention may be used to conduct an oral Q&A session with a student or another person; this session may test the respondent's understanding of a subject and may provide feedback to the respondent during or after the session. Often (but not necessarily) such a session may be conducted with a single respondent. The AI system may pose one or more questions to the respondent based on information that describes what the respondent should have learned or should know, such as curated content from a course the respondent is taking. The respondent may answer, and subsequent questions may be based in part on the respondent's answer. The respondent's answers may be recorded and evaluated by the AI system.

Figure 4:
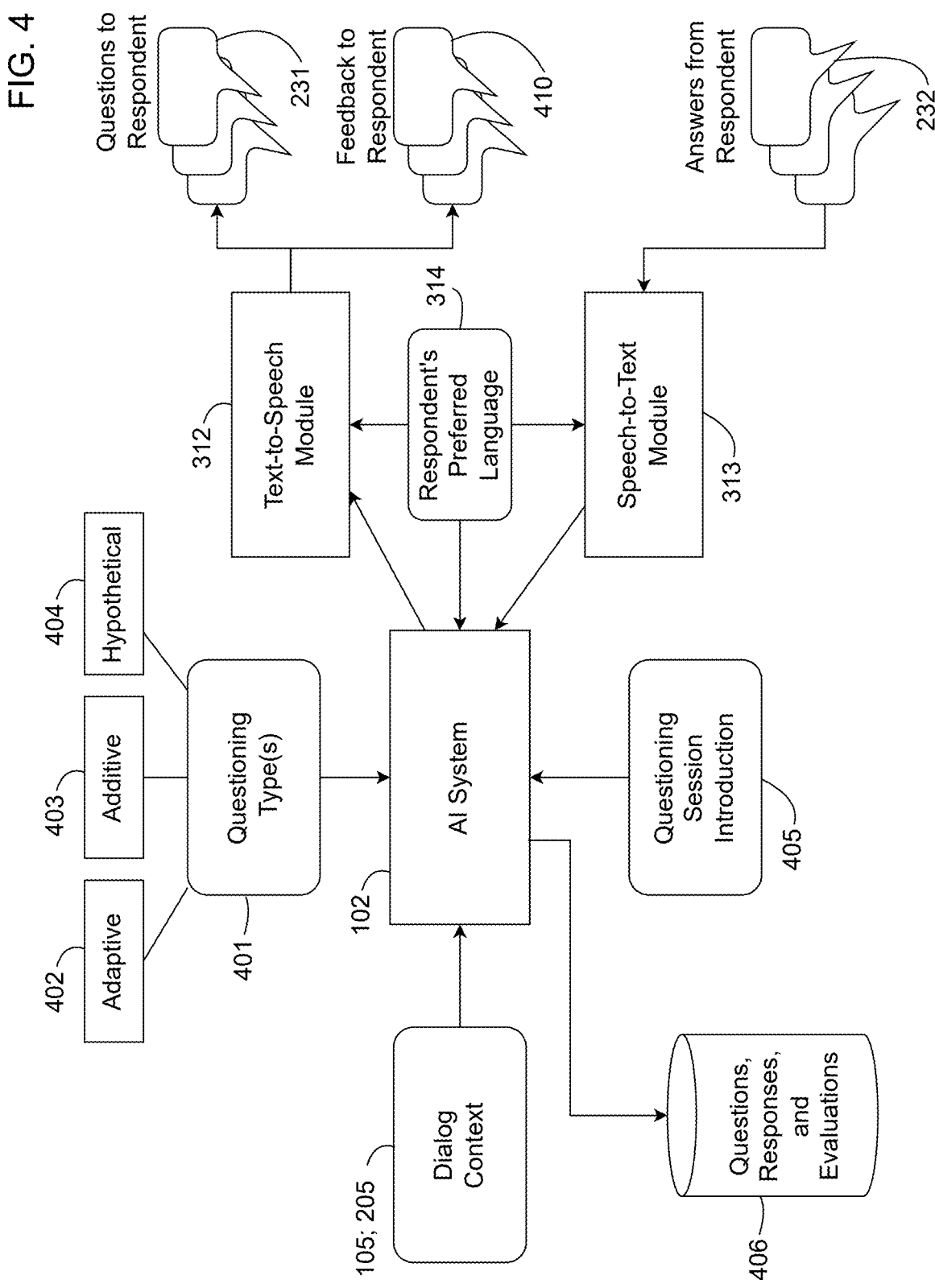
FIG. 4 shows an architectural block diagram of an illustrative embodiment of the system that conducts and evaluates an oral question and answer (Q&A) session with a single respondent.

FIG. 4 shows an architectural block diagram of selected components of an illustrative system that conducts an oral Q&A session with a respondent. Much of the functionality of the illustrative system is similar to that of the system shown in FIG. 3. However, there is no live moderator in the illustrative system of FIG. 4, since in most cases the Q&A dialog will be conducted directly between the AI system and the respondent, without a human moderator. For example, in at least one embodiment, the question-and-answer session is limited to a single respondent, such that the artificial intelligence engine conducts an oral dialog exclusively with the respondent without requiring multiple participants or a moderator. In one or more embodiments, the respondent is identified using a stored voice fingerprint prior to initiation of the question-and-answer session. One illustrative application of this system is evaluation of a student in a class. Other applications may include, for example, job interviews, preparation for tests or interviews or debates, or professional development. In addition to serving as an evaluation tool, the system may also be used to educate the respondent by providing feedback on the respondent's answers, and by guiding the respondent to think through information and situations.

The system of FIG. 4 includes AI system 102 (described above with respect to FIG. 3). It also includes text-to-speech and speech-to-text modules 312 and 313, respectively, which may accept a preferred language 314 for the respondent; these modules allow the Q&A session to be entirely oral, which may help limit the respondent's use of generative AI tools or search engines to generate answers. Using oral communication provides several other potential benefits: (1) When dealing with complex scenarios and problem-solving tasks, speech-to-text allows respondents to think aloud, providing a more comprehensive view of their reasoning process. This can lead to more detailed and expansive answers, capturing the respondent's thought process in real-time. It also encourages the respondent to articulate his or her critical thinking and problem-solving skills more effectively than typing, which can often be more restrictive and time-consuming. (2) Natural Expression: Respondents can express their ideas more naturally and fluidly through speech, capturing nuances and details that might be missed in written responses. (3) Reduced Cognitive Load: Speaking reduces the cognitive burden associated with typing, allowing respondents to focus on the content of their responses rather than the mechanics of writing. (4) Enhanced Engagement: Speech-to-text can create a more interactive and engaging learning experience, mimicking real-life discussions and debates. (5) Real-Time Feedback: The technology can provide real-time feedback on speech clarity and content, helping respondents improve their communication skills.

Although the Q&A session may not have a moderator that is active during the Q&A session, an instructor or other person may provide session information to the AI system that will guide the future Q&A session. The system may include a data collection user interface that allows this instructor or other person to input the session information. This session information may include for example a dialog context (105; 205), described above with respect to FIG. 3. This dialog context may include for example information that has been taught in a course, reference materials, and the respondent's previous work. In one or more embodiments, the dialog context may include weights for different context elements, and the AI system may use elements with higher weights more frequently or with more importance in the generated questions or the evaluations. For example, a student's essay might be weighted a 5 and a textbook reading a 3, which means the questioning will be focused on the essay with backup support from the textbook. Or both might be a 5 which gives them both equal weight in the questioning and ultimate assessment. The session information may also include instructions for how the Q&A session should be conducted and what its objectives are. The session information may include a session introduction 405 that should be provided to the respondent at the beginning of a session, and an identification of one or more questioning types 401 that should be used during the session. Illustrative questioning types may include for example, without limitation, adaptive questioning 402, additive questioning 403, and hypothetical questioning 404. These questioning types are described in detail below with respect to FIG. 6. For example, in at least one embodiment, the AI system or artificial intelligence engine dynamically selects among the one or more questioning types during the question-and-answer session to optimize assessment of comprehension. In one or more embodiments, the AI system or the artificial intelligence engine dynamically selects among the one or more questioning types during the question-and-answer session to optimize assessment of comprehension.

Based on the session information (such as context 105 or 205, session introduction 405, and questioning type or types 401) provided in advance of the session, when the Q&A session occurs the AI system 102 generates a sequence 231 of questions and presents these orally to the respondent. The respondent provides oral answers 232. The AI system analyzes the answers 232 and provides feedback and evaluations 410 to the respondent, possibly during the session and/or at the end of the session. The questions, responses, and evaluations are stored in a database or memory 406. Additional information that may be stored in database 406 may include the timing of each step of the session, such as how long the respondent took to answer, and the number of attempts the respondent made to answer each question. One or more embodiments of the invention may also include analytics modules that analyze the database 406 for trends or patterns, for example to assess a student's progress over multiple Q&A sessions.

Figure 5:
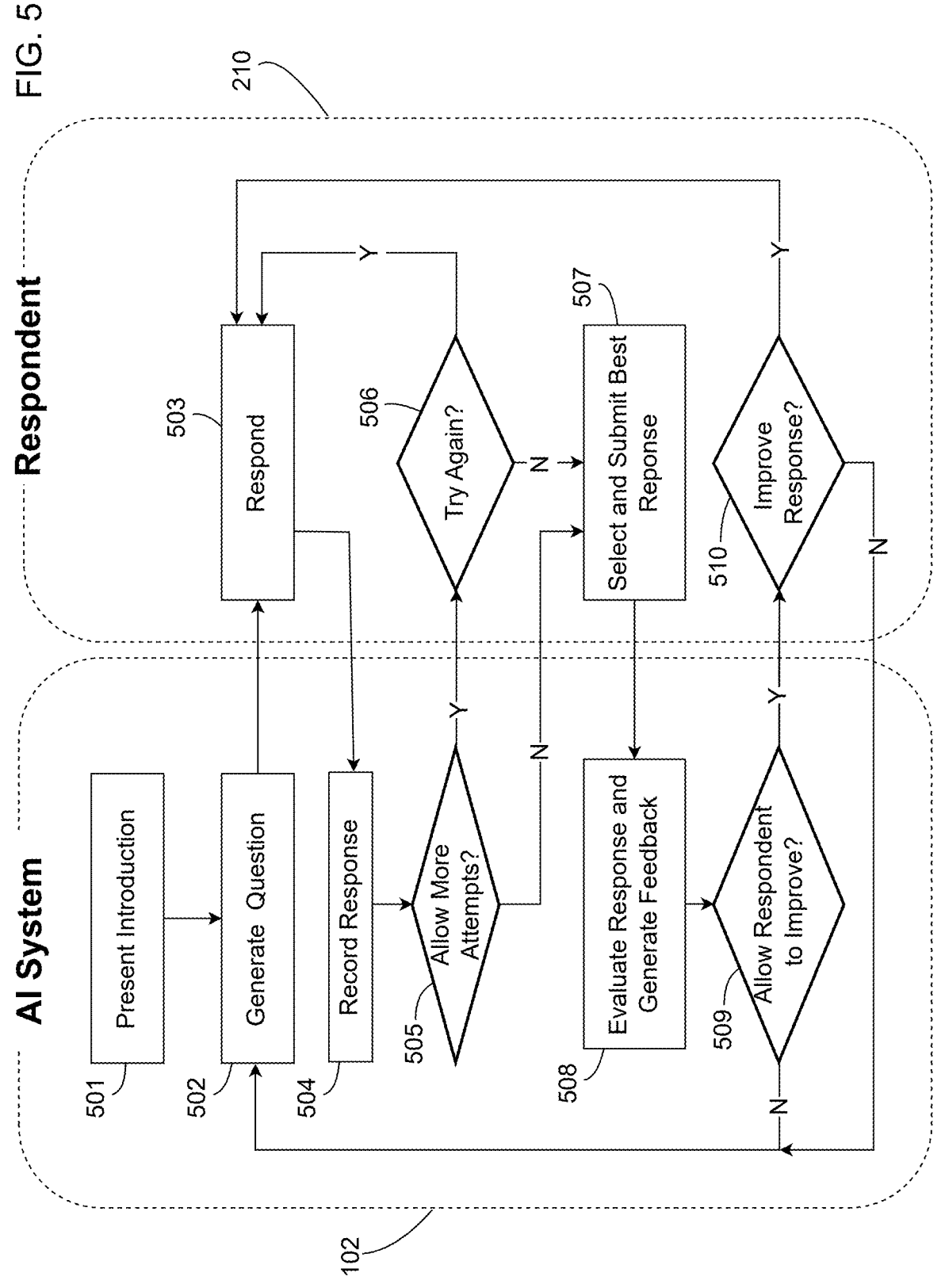
FIG. 5 shows an illustrative flowchart of steps performed by the AI system and by the respondent in an oral question and answer session.

FIG. 5 shows an illustrative flowchart of steps that may be performed by the AI system 102 and by the respondent 210 in a Q&A session. First, the AI system may perform step 501 to present an introduction to the Q&A session. The introduction may, for example, inform the student of the material being covered and the expectations of the session. It may also describe the rules and procedures of the session, such as that the session should be completed in one sitting, that all responses will be recorded, and that the respondent may be given some fixed number of attempts to answer a question. It may also describe criteria that may be used for evaluation. The respondent may interact with the system (for example, to choose to retry a response) either fully orally or using an input device such as a keyboard, mouse, or touchscreen.

An illustrative introduction is as follows: "In this week's course on enterprise management, we covered automated enterprise systems. We discussed the relative importance of CRM, ERP and SCM. This Q&A session is intended to assess your understanding of these concepts and your ability to apply your knowledge of these systems within practical situations. The session will use all the course material from this week's class including chapters 2 and 3 of the assigned textbook Organizational Management as well as the TEDx video by MIT professor Dr. Greenwald plus your turned in essay which involved a hypothetical operational situation. Good luck."

After introduction 501, the session may consist of an iterated loop of question/answer steps. Within a particular question, there may be additional loops if the respondent makes multiple attempts to answer. First the AI system performs question generation 502 and transmits the question to the respondent. Each question may be based on any available information such as the dialog context, previous questions, and previous answers. The question may be read aloud to the respondent using the text-to-speech module. The respondent then provides an oral response in step 503. This is transmitted to the AI system via the speech-to-text module and is recorded in the database (along with the time elapsed between question and answer) in step 504. The AI system then makes a decision 505 as to whether to allow the respondent (if desired) to make another attempt to answer the question. This decision 505 may be based on a simple count; for example, the respondent may be able to retry up to some fixed number of times (such as 5 total response attempts), or it may be based on other information such as the total time the respondent has spent on the question, or the assessed quality of the responses so far to the question. If the system allows more attempts, the respondent may then make choice 506 as to whether to try again to answer the question.

If the respondent wants to retry, the response loop continues until either the system or the respondent determines that enough attempts have been made to answer the question. All attempts are recorded.

When the respondent has made as many attempts as desired or allowed to respond to the question, in step 507 the respondent may select his or her best response and submit this to the system for evaluation or alternatively in some embodiments after multiple iterative responses, for example that build on each other, step 507 is automatically performed to provide the aggregated responses to be evaluated at step 508. In this latter embodiment, the iterations of steps 503, 504, 505 and 506 allow the respondent to improve their answer, i.e., not repeat what they have already stated. The system then performs evaluation 508 and provides feedback to the respondent on his or her selected response or aggregated responses. This feedback may include suggestions on how to improve the response. In one or more embodiments, the respondent must read back aloud the feedback and any suggestions for improvement. The accuracy of the respondent's reading aloud of the suggestion(s)/feedback must be over a predefined threshold, e.g., 70%. In one or more embodiments, the accuracy of the respondent's reading aloud of the question must be over a predefined threshold, which may be the same as the threshold of the reading aloud of the suggestion(s)/feedback. This near real-time feedback encourages reflection and provides the respondent with an opportunity to learn and retry answering the question again based on suggested refinement from the system. The feedback may highlight areas of strength and offer the respondent opportunities for improvement. It also may encourage the respondent to reflect on their learning process and the reasoning behind their answers. This is part of the "production effect" described in more detail further below, but which in short enables greater comprehension and recall of the subject material.

After providing feedback with the evaluation 508, the system then makes decision 509 as to whether to allow the respondent to improve. Like test 505, this may be based on a simple count, where the respondent has a fixed maximum number of attempts (such as 3), or it may be based on other information such as the quality of the evaluated response. If the system allows it, the respondent may make decision 510 as to whether to try again to improve the evaluation.

For example, in an illustrative embodiment up to five iterative answers may be allowed for each question. A question 502 is asked and the respondent submits a response 507. That attempt may be followed by an assessment and suggestions for improving the answer 508. The respondent does not have to reiterate the previous attempt. All they must do is add to (or modify) that answer in the subsequent attempt 507; the system will then assess the first two assessments and provide additional suggestions for approvement if AI deems it's required. This process may continue for up to three more iterations. The final assessment follows up to 5 iterative attempts all of which are taken into consideration. All iterative attempts may be lumped into a final assessment and feedback for that particular answer. In one or more embodiments after analyzing the response at 508, a difficulty level for a question may be adjusted at 502. This may occur via automatically detecting the level of proficiency of the respondent or may be entered manually or a level may be built in for a given class by the faculty for example.

When the system or the respondent has improved the response as much as allowed or desired, the question/answer loop for this question is complete, and the system proceeds to step 502 to generate a subsequent question. This process may continue until some stopping criterion is reached, such as a fixed number of questions or time, or evaluation of questions reaching a desired level. A final evaluation may be provided to the respondent at the end of the session, along with suggestions on how to improve or weak areas of knowledge that the respondent should focus on in the future.

Because the system stores all the attempts, selected responses, and evaluations in database 406, one or more embodiments may use this data, possibly from multiple Q&A sessions, to create a learning path for the respondent that measures improvement over time. A learning analytics component coupled to the database may track the respondent's progress, identify areas of struggle, and adapt the difficulty and focus of questions accordingly. This creates a personalized learning experience that continuously challenges respondents at their optimal level of development.

Figure 6:
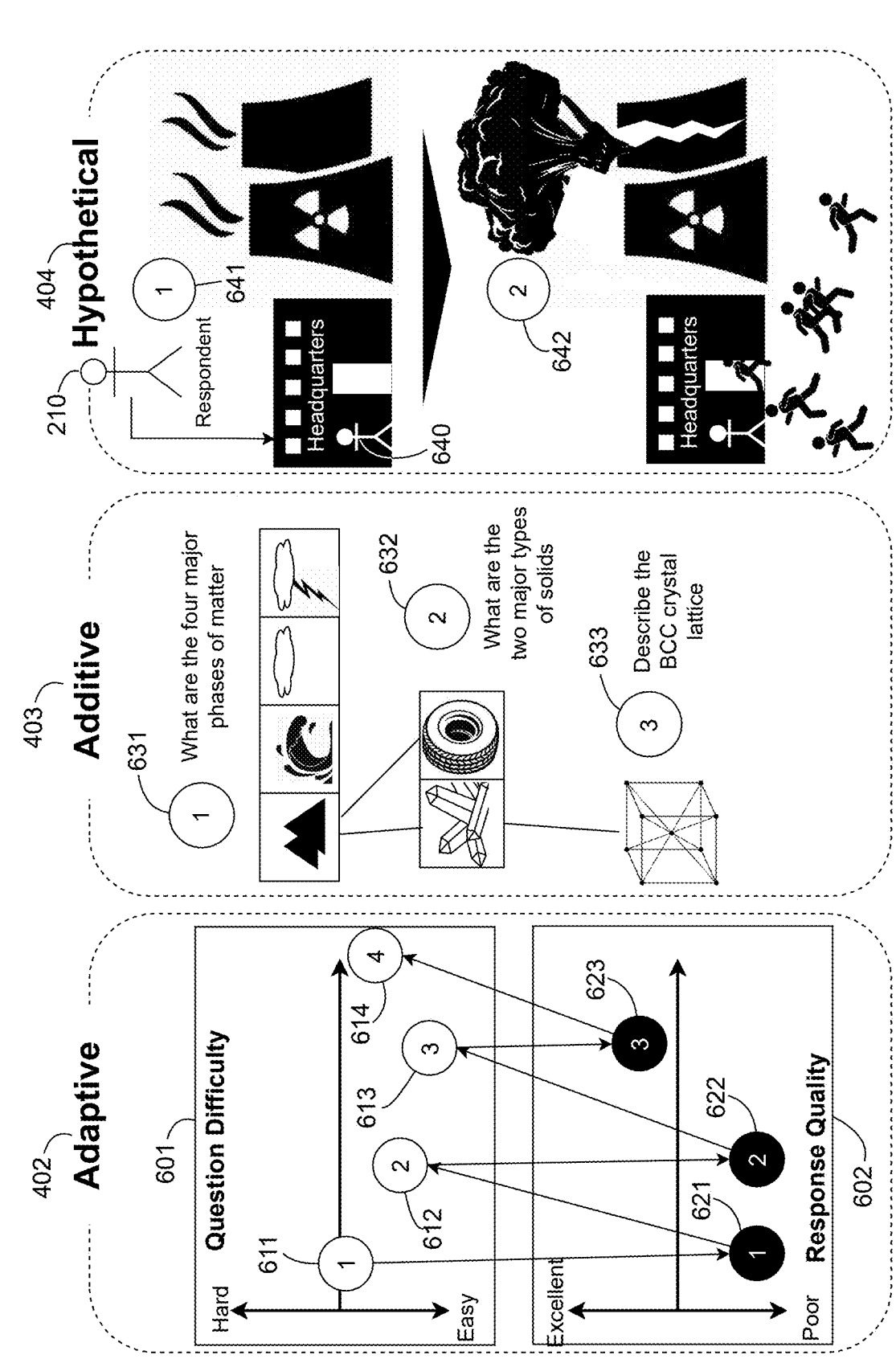
FIG. 6 shows three illustrative types of questioning that may be used by the system in an oral Q&A session: adaptive questioning, additive questioning, and hypothetical questioning.

As illustrated in FIG. 4, the type or types of questioning 401 may be selected (for example by a course teacher) to guide the Q&A session. Specific sequences of questions that follow the desired questioning type(s) may be generated by the AI system. FIG. 6 illustrates three types of questioning that may be used in one or more embodiments. These questioning types are illustrative; one or more embodiments may define and use additional types of questioning.

Adaptive questioning style 402 refers to a dynamic and responsive approach to asking questions, typically used in assessments, interviews, or AI-driven interactions customized to each respondent. The questions may be adjusted in real-time based on the responses provided, with the goal of tailoring the inquiry to each respondent's level of knowledge and understanding. This method may be used for example to gather more relevant information, improve engagement, and achieve more accurate outcomes. For example, subsequent questions are modified in real time based on a correctness of prior responses.

Key characteristics of adaptive questioning may include: (1) Personalization: The questions may be tailored to each respondent's specific needs, background, or responses. For instance, if a respondent demonstrates strong knowledge in a particular area, the subsequent questions might become more challenging. However, if the respondent is determined to be struggling with the question, subsequent question might be reduced in difficulty. (2) Real-Time Adjustments: As the respondent answers each question, the system assesses the response and adjusts the next question accordingly. This can mean altering the complexity, topic, or focus of subsequent questions. (3) Goal-Oriented: The questioning may be designed to achieve a specific goal, such as assessing competence, understanding a psychological state, or uncovering detailed information. This adaptability helps in honing-in on areas of interest or concern more effectively. (4) Engagement and Motivation: By adapting to the individual's responses, this approach can keep the respondent more engaged and motivated. For example, if a respondent is struggling with a concept, the system might switch to simpler questions or provide hints to maintain engagement. (5) Efficiency: Adaptive questioning can make the assessment or interview process more efficient by focusing only on relevant areas, rather than following a rigid question list. This can provide more valuable insight. (6) Feedback Mechanism: As in each type of questioning, adaptive questioning will include immediate feedback along with suggestions for an improved answer or a request for a further explanation based on previous answers, helping the respondent learn or clarify misunderstandings in close to real-time.

Illustrative applications of adaptive questioning may include for example: (1) Educational Assessments: Used in adaptive learning systems to assess student knowledge and tailor educational content to their learning pace. (2) Psychological Evaluations: Helps in understanding a person's mental state or cognitive abilities by adjusting questions based on their emotional or cognitive responses. (3) Job Interviews: Can be used by HR professionals to tailor interview questions based on a candidate's experience and qualifications. (4) AI-Driven Customer Support: AI chatbots might use adaptive questioning to better assist customers by asking follow-up questions based on their previous answers.

The adaptive questioning method is particularly powerful where understanding an individual's depth of knowledge, emotional state, or specific needs is crucial for making informed assessments and for providing targeted support.

FIG. 6 shows an illustrative type of adaptive questioning that adjusts the difficulty of questions 601 based on the quality of the respondent's answers 602. (This is only one type of adaptation; as described above many different types of adaptations may be used.) In the example shown in FIG. 6, the first question 611 is of medium difficulty, but the response 621 is of poor quality. The system therefore decides to make the subsequent question 612 somewhat easier. Since response 622 is still of poor quality, the third question 613 is even easier. The respondent provides a good quality response 623 to the third question; therefore, the fourth question 614 is increased somewhat in difficulty. This process may continue as it attempts to converge on a sequence of questions that are neither too difficult nor too easy.

Additive questioning style 403 is a technique where each new question builds upon the previous ones to deepen understanding, expand on a topic, or explore additional details. This method is often used in interviews, surveys, or educational contexts to gradually construct a more comprehensive view of a subject. For example, each question builds upon content of prior questions and responses.

Key features of additive questioning may include, for example: (1) Sequential Building: Each question may add more layers or details to the previous one, gradually expanding the conversation or inquiry. The process is cumulative, meaning that each question is designed to build on the information already provided. (2) Depth and Breadth: The approach can be used to either delve deeper into a particular aspect of a topic (depth) or to expand the scope by exploring related areas (breadth). (3) Logical Progression: The questions are usually arranged in a logical sequence, where each one naturally follows from the previous answer. This helps in creating a coherent and detailed exploration of the subject. (4) Exploratory Nature: Additive questioning is often used when the goal is to explore a subject comprehensively, uncover nuances, or understand complex issues. As with adaptive questioning, adding questions that build on prior answers, the inquirer can gather a more nuanced and complete picture.

Illustrative examples of additive questioning include: (1) Research Interviews: The system will start by asking a general question, such as, "How do you feel about your current work environment?" Based on the response, it could follow up with, "Can you describe a specific incident that influenced your feelings?" and then, "How did that incident impact your performance at work?" (2) Educational Settings: A teacher might ask a student, "What is the main theme of this story?" and then follow up with, "How does the author develop this theme through the characters?" followed by, "Can you provide an example from another text where a similar theme is explored?" (3) Customer Feedback: A customer service representative might begin with, "How satisfied are you with our product?" and then add, "What specific features do you find most useful?" and finally, "How could we improve these features to better meet your needs?"

Purposes of additive questioning may include for example: (1) Comprehensive Understanding: The goal is to gain a more detailed and nuanced understanding of a topic by gradually adding questions that explore different dimensions or details. (2) Engagement: This technique can keep respondents engaged by gradually guiding them to think more deeply about the subject. (3) Structured Exploration: It allows for a structured approach to exploring a topic, ensuring that key areas are covered systematically.

In summary, additive questioning is a method that involves progressively building upon previous questions to explore a topic more thoroughly. It's a powerful technique for gaining in-depth insights and ensuring that all relevant aspects of a subject are considered.

FIG. 6 shows a portion of an illustrative additive questioning session for a chemistry course on chemistry, that proceeds hierarchically through different structures of matter, starting with the top-level question 631 on phases, then drilling down in question 632 into the solid phase, and finally drilling down further in question 633 into a particular type of crystal structure. This sequence presumes that the respondent answers correctly at each stage; if not, then the sequence might be altered.

Hypothetical questioning style 404 involves asking a respondent to consider a fictional scenario and then respond to questions based on that scenario. This method may be used to assess problem-solving skills, decision-making abilities, creativity, and how someone might handle specific situations. For example, the respondent may be asked to imagine themselves in a particular role and then to respond to questions about how they would manage certain challenges or make decisions. For example, questions are framed in fictional or scenario-based contexts.

Key Features of Hypothetical Questioning may include: (1) Imaginary Scenario: The respondent is placed in a fictional or hypothetical situation, often relevant to the context being studied. For example, in a class on supply chain management, a student may be asked to imagine being a director of supply chain in an enterprise-sized business and then respond to questions about how they would manage certain challenges or make decisions. (2) Role-Specific Context: The questions are tailored to the specific responsibilities or challenges of the hypothetical role. For instance, as a director of supply chain, the student might be asked about handling disruptions, optimizing logistics, or managing supplier relationships. (3) Exploration of Thought Processes: The goal is to understand the respondent's thought process, strategic thinking, and how they approach problem-solving. It's less about finding a "correct" answer and more about assessing how they analyze the situation and come to a decision. (4) Assessment of Competencies: This technique is commonly used in job interviews, especially for leadership or strategic roles, to gauge a candidate's skills, such as leadership, critical thinking, crisis management, and ethical decision-making.

Illustrative hypothetical questions for the example mentioned above of becoming a director of supply chain may include: "Imagine that one of your key suppliers has just informed you that they will be unable to fulfill a critical order due to a sudden factory shutdown. This will delay your production line by two weeks, potentially leading to significant losses. How would you handle this situation?" Potential follow-up questions may include: "What steps would you take immediately upon receiving this news?" "How would you communicate this issue to senior management and other stakeholders?" "What strategies would you employ to mitigate the impact on your production schedule?" "How would you evaluate and manage the risk of this happening again in the future?"

Potential purposes of hypothetical questioning may include: (1) Evaluating Problem-Solving Skills: By putting the respondent in a challenging scenario, an evaluator can see how they approach problem-solving, whether they think strategically, and how they manage resources and risks. (2) Understanding Decision-Making: It helps assess how the respondent makes decisions under pressure, including how they prioritize tasks, consider the consequences, and balance short-term needs with long-term goals. (3) Assessing Leadership and Communication: For roles involving leadership, these questions can reveal how the respondent would lead a team, communicate difficult news, and manage stakeholders in complex situations. (4) Testing Creativity and Innovation: Hypothetical questions can also test creativity by seeing how the student might innovate or think outside the box to solve a problem.

Potential applications of hypothetical questioning include: (1) Job Interviews: used in interviews for management or executive roles to assess a candidate's suitability for the position. (2) Training and Development: Used in leadership training programs to help participants develop critical skills by responding to realistic scenarios. (3) Academic and Educational Settings: Employed in case studies or exams to test students' application of theoretical knowledge to practical situations.

In summary, hypothetical questioning is a powerful tool for assessing how someone would handle specific situations by putting them in a realistic yet fictional scenario. It provides insights into their problem-solving, decision-making, and leadership abilities, making it particularly valuable in high-stakes or complex roles.

FIG. 6 shows a portion of an illustrative hypothetical questioning session for a management and leadership course. First respondent 210 is asked to imagine that they have been appointed the director 640 of a nuclear power plant. The first question 641 may ask for example what the first steps the respondent would take in the new role. A follow-on question 642 may present an emergency crisis at the plant where everyone panics and may ask how the respondent would try to manage the situation.

In one or more embodiments of the invention, the respondent may be required (or encouraged) to read aloud some of the material generated by the AI system, such as the questions or the feedback to responses, in addition to responding orally to the questions. Reading this material aloud helps the respondent understand and remember the material and it reinforces the learning effect provided by the invention. Many studies have shown that reading information aloud improves retention and understanding compared to reading silently, and the system may leverage this effect to improve learning outcomes. An additional benefit of requiring respondents to read material aloud is that it helps them practice expression in the language with which they are conducting the learning session; this may be particularly valuable for respondents that are learning in a language other than their native language, such as foreign students, visiting scholars, or immigrants. The system may provide feedback to these language learners on the quality of their articulation of the material that they read, helping them improve their language skills.

Figure 7:
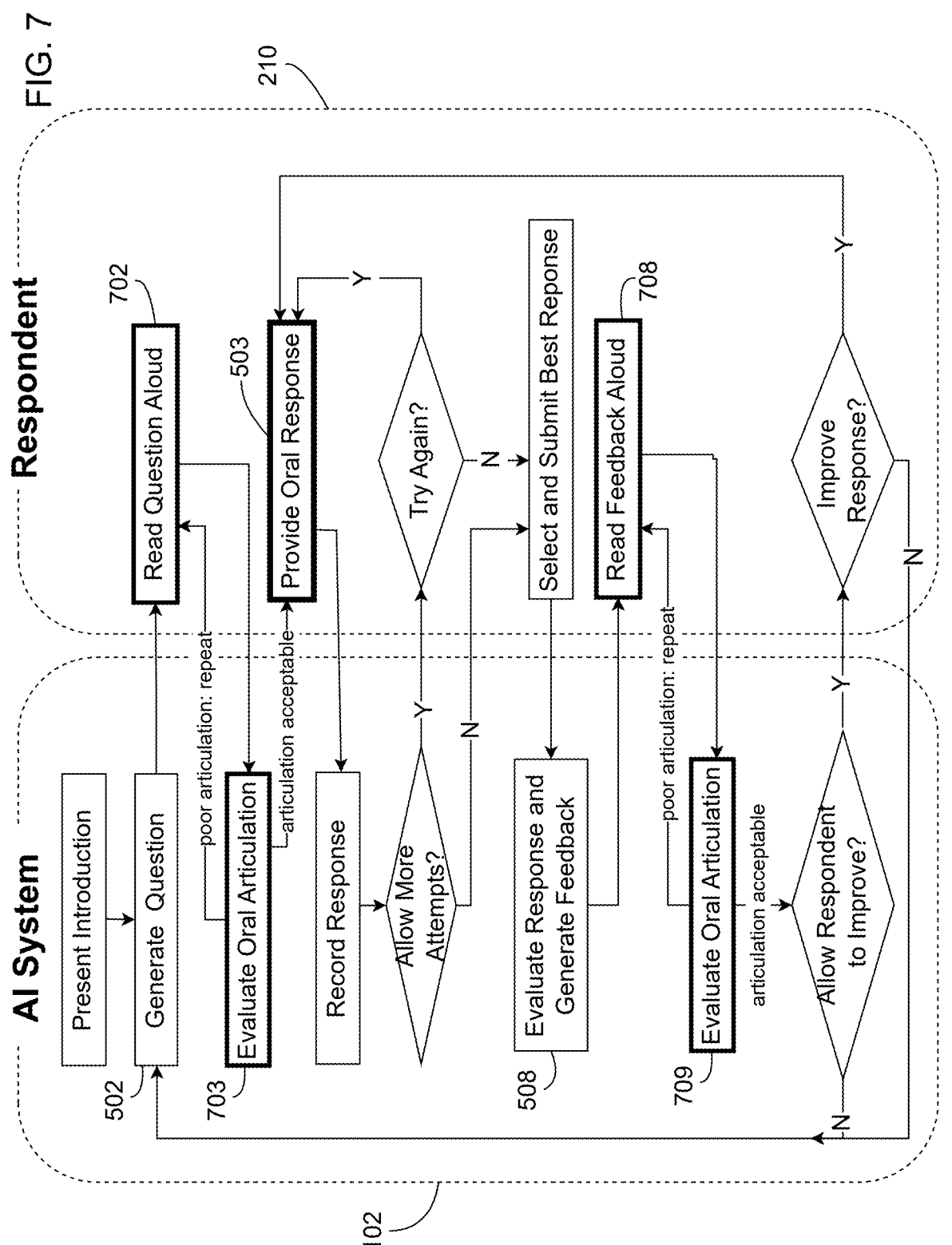
FIG. 7 shows a variation of the flowchart of FIG. 5 wherein the respondent is also required to read aloud the questions, his or her responses, and the feedback to the responses.

FIG. 7 shows an illustrative flowchart that expands on the flowchart of FIG. 5 to include required reading aloud by the respondent of information generated by the AI system, and of the responses given by the respondent to the system's questions. When AI system 102 generates a question in step 502, it may transmit this question to the respondent 210 in text format and may prompt the respondent to read the text of the question aloud in step 702. In one or more embodiments, AI system 102 may play an audio of the question and also transmit the text of the question for the respondent to read aloud. AI system 102 may record the respondent's oral reading of the question and may analyze it in step 703 to determine how well the respondent articulated the question. This assessment 703 may for example analyze the respondent's pronunciation, inflection, correct recitation of words, timing and pacing, or any other aspects of language expression. These analyses may consider the respondent's native language or any known issues the respondent has with the session language, when these are known. Assessment 703 may be transmitted to the respondent.

In one or more embodiments, evaluation 703 may determine whether the articulation of the question in the oral recitation 702 by the student is acceptable. For example, evaluation 703 may assign an articulation quality score to the respondent's reading of the question and it may classify the reading as acceptable if the quality score exceeds a threshold value, such as 70% for example. If the articulation quality is unacceptable, the system may prompt the respondent to repeat the reading of the question; this may be repeated multiple times if needed or desired. The prompt to repeat the reading may include comments on the respondent's articulation and possibly suggestions on how to improve.

If the articulation quality of the respondent's reading aloud of the question is acceptable, the AI system may prompt the respondent to answer the question. The respondent may provide an oral response 503 to the question, rather than a written response, in one or more embodiments. Requiring the respondent to speak the response aloud also reinforces the learning process; even if the respondent has for example used an AI tool to generate the response, forcing the respondent to read the response may help the respondent learn the material. The respondent's response is transmitted to the AI system, and the respondent may have multiple opportunities to respond, as described with respect to FIG. 5. Once the respondent has selected and submitted his or her best response, AI system performs step 508 to evaluate the response and to generate response feedback; the response feedback is transmitted to the respondent. The respondent may then be prompted to read the response feedback aloud in step 708; reading the feedback aloud ensures that the respondent pays attention to the feedback and improves the respondent's understanding and retention of the feedback.

Just as AI system 102 may evaluate the respondent's articulation of the question in step 703, the system may evaluate the respondent's articulation of the response feedback in step 709. AI system 102 may record the respondent's oral reading of the response feedback and may analyze it in step 709 to determine how well the respondent articulated the question. This assessment 709 may for example analyze the respondent's pronunciation, inflection, correct recitation of words, timing and pacing, or any other aspects of language expression. These analyses may consider the respondent's native language or any known issues the respondent has with the session language, when these are known. Assessment 709 may be transmitted to the respondent.

In one or more embodiments, evaluation 709 may determine whether the articulation of the response feedback in the oral recitation 708 by the student is acceptable. For example, evaluation 709 may assign an articulation quality score to the respondent's reading of the response feedback and it may classify the reading as acceptable if the quality score exceeds a threshold value, such as 70% for example. If the articulation quality is unacceptable, the system may prompt the respondent to repeat the reading of the response feedback; this may be repeated multiple times if needed or desired. The prompt to repeat the reading may include comments on the respondent's articulation and possibly suggestions on how to improve.

When the evaluation 709 determines that the reading 708 of the response feedback is acceptable, the process may continue as described with respect to FIG. 5: the respondent may be given opportunities to improve the response, and after some number of attempts the system may move to a subsequent question (or terminate the learning session).

Figure 8:
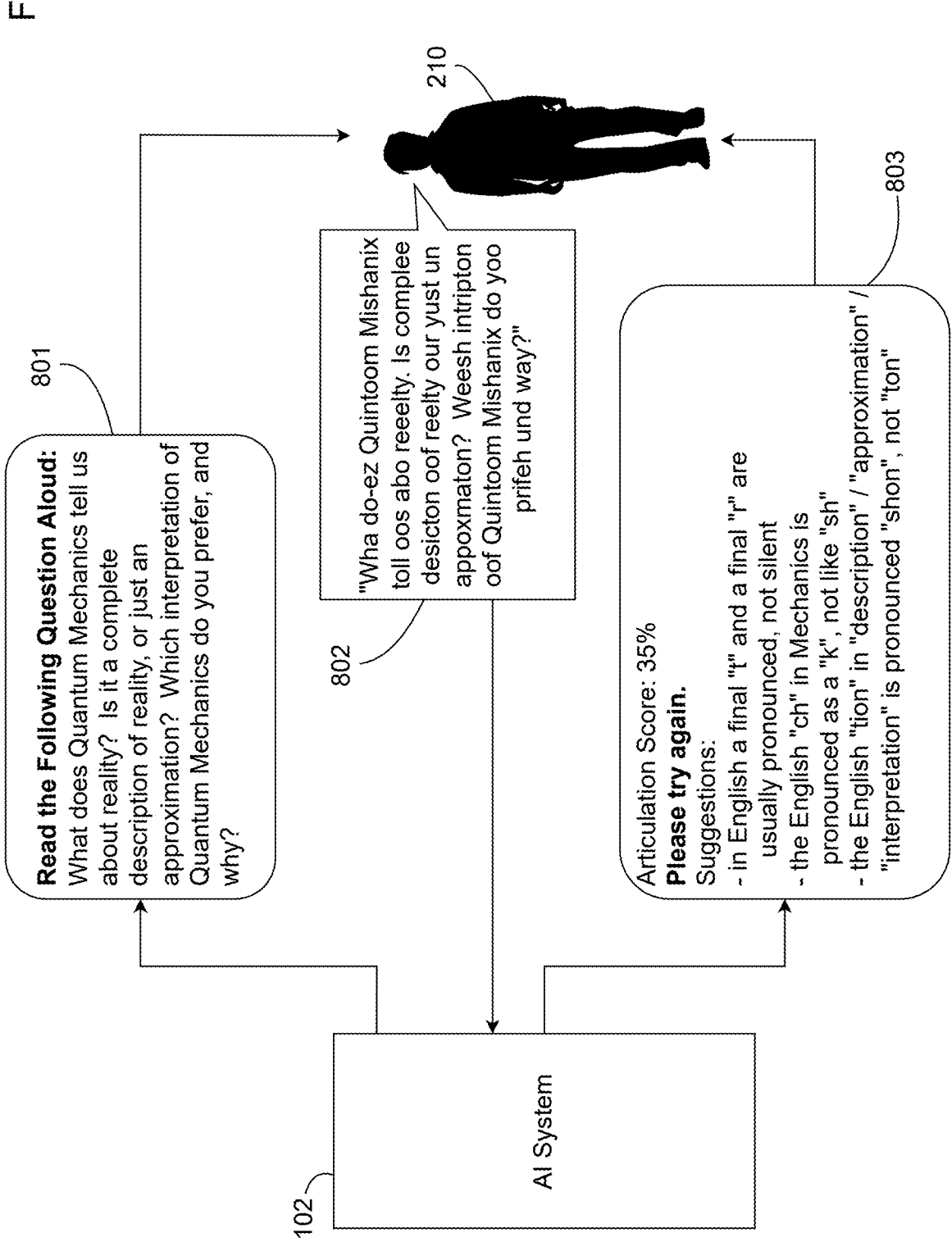
FIG. 8 shows an illustrative interaction between the AI system of FIG. 7 and a respondent, where the system evaluates the respondent's reading aloud of the question and provides feedback to improve the articulation.

FIG. 8 shows a portion of an illustrative session between the AI system 102 and a respondent 210, which illustrates steps 502, 702, and 703 of the flowchart of FIG. 7. In step 502, system 102 generates question 801 and transmits the text of the question to the respondent. In step 702, respondent 210 provides oral reading 802 of question 801; in this example the respondent mispronounces several words. In step 703, system 102 provides evaluation 803 of the reading 802; this evaluation includes a score and specific suggestions for how to improve the reading. The system prompts the respondent to reread question 801 to improve the articulation.

Figure 9:
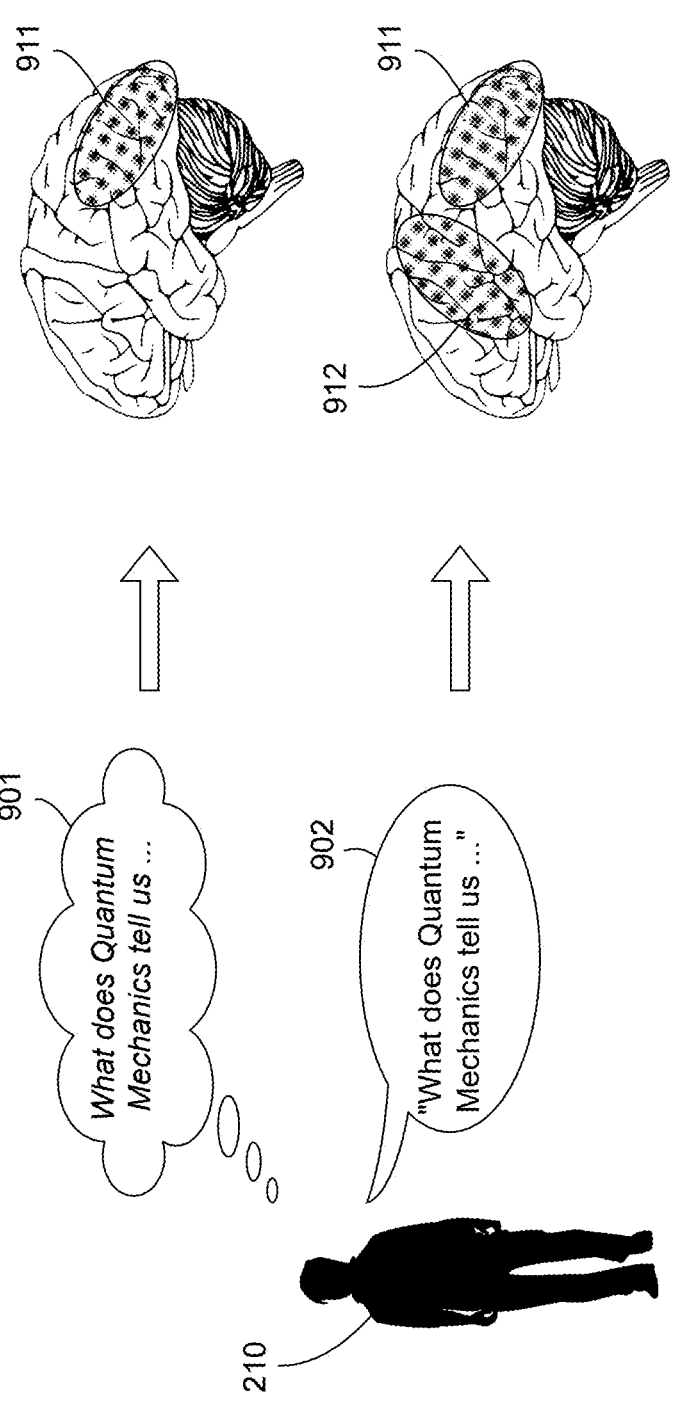
FIG. 9 illustrates a benefit of the system of FIG. 7 that requires reading aloud of questions, responses, and feedback: reading aloud engages more areas of the brain than reading or responding silently, thereby improving learning and retention.

Requiring the respondent to read material aloud increases learning effectiveness due to the widely studied "production effect", wherein actively producing words or phrases improves retention and understanding since additional parts of the brain are involved compared to silent reading. This effect is illustrated in FIG. 9. If a respondent 210 performs silent reading 901 of, for example, a question, then specific areas 911 of the brain are involved, including visual processing (to see and interpret the written text) and cognitive regions used for understanding words. In contrast, when respondent 210 performs speaking 902 of a question (or other material), additional regions 912 of the brain are engaged, in addition to the regions 911 that are engaged for silent reading. These additional brain regions include for example: neuromuscular control regions (to direct the muscles that generate sound); auditory processing to hear and interpret the spoken words; Broca's area (left inferior frontal gyrus BA44/45), which is crucial for phonological processing, articulatory planning, and working memory for speech; and the insular cortex, which supports coordination of complex articulatory motor functions. Recruitment of these additional regions 912 during reading aloud has been shown in many scientific studies to improve learning and retention.

While the invention herein disclosed has been described by means of specific embodiments and applications thereof, numerous modifications and variations could be made thereto by those skilled in the art without departing from the scope of the invention set forth in the claims.

What is claimed is:

1. An artificial intelligence system that generates questions and evaluates oral readings and responses, comprising:
an artificial intelligence engine comprising
a processor; and
a large language model; and,
a data collection user interface configured to:

accept session information describing a question-and-answer session to be held between said artificial intelligence engine and a respondent; and,
transmit said session information to said artificial intelligence engine;
wherein said artificial intelligence engine is configured to receive said session information;
wherein said session information is received and entered into said data collection user interface prior to said question-and-answer session;
wherein said session information comprises information that is configured to be received from one or more of
a user other than said respondent, and
other data sources other than said respondent;
generate a text question for said respondent based on said session information and based on previous responses of said respondent,
transmit said text question to said respondent;
receive an audio reading of said text question from said respondent;
generate an evaluation of articulation quality of said audio reading of said text question;
transmit said evaluation of articulation quality of said audio reading of said text question to said respondent;
receive an audio response to said text question from said respondent;
generate response feedback based on said audio response and on said session information;
transmit said response feedback to said respondent;
receive an audio reading of said response feedback from said respondent;
generate an evaluation of articulation quality of said audio reading of said response feedback; and,
transmit said evaluation of articulation quality of said audio reading of said response feedback to said respondent.

2. The artificial intelligence system that generates questions and evaluates oral readings and responses of claim 1, wherein said artificial intelligence engine is further configured to:
when said articulation quality of said audio reading of said text question is below a threshold, prompt said respondent to repeat said audio reading of said text question; and,
when said articulation quality of said audio reading of said response feedback is below said threshold, prompt said respondent to repeat said audio reading of said response feedback.

3. The artificial intelligence system that generates questions and evaluates oral readings and responses of claim 1, wherein
said session information comprises one or more questioning types; and
said one or more questioning types comprise one or more of:
adaptive questioning;
additive questioning; and,
hypothetical questioning.

4. The artificial intelligence system that generates questions and evaluates oral readings and responses of claim 3, wherein said one or more questioning types further comprise: adaptive questioning, wherein subsequent questions are modified in real time based on a correctness of prior responses; additive questioning, wherein each question builds upon content of prior questions and responses; and hypothetical questioning, wherein questions are framed in fictional or scenario-based contexts.

5. The artificial intelligence system that generates questions and evaluates oral readings and responses of claim 4, wherein said artificial intelligence engine dynamically selects among said one or more questioning types during the question-and-answer session to optimize assessment of comprehension.

6. The artificial intelligence system that generates questions and evaluates oral readings and responses of claim 1, wherein:

said session information comprises a session introduction; and, said artificial intelligence engine is further configured to transmit said session introduction to said respondent at a beginning of said question-and-answer session.

7. The artificial intelligence system that generates questions and evaluates oral readings and responses of claim 1, wherein:

said session information comprises a dialog context; and, said dialog context comprises one or more of:

written output generated by said respondent;

a course rubric;

assignment instructions;

class notes;

class lectures;

anticipated learning outcomes;

background information on a topic.

8. The artificial intelligence system that generates questions and evaluates oral readings and responses of claim 7, further comprising an image interpreter configured to obtain an image, wherein said image interpreter is coupled with or is within said artificial intelligence engine; and, wherein said artificial intelligence engine is configured to update said dialog context based on said image.

9. The artificial intelligence system that generates questions and evaluates oral readings and responses of claim 1, further comprising a database;

wherein said artificial intelligence engine is further configured to store said text question, said audio response, and said evaluation in said database.

10. The artificial intelligence system that generates questions and evaluates oral readings and responses of claim 1, wherein said artificial intelligence engine is further configured to:

when said artificial intelligence engine receives said audio response to said text question, ask said respondent if said respondent wants to make another attempt to answer said text question; and, when said respondent generates multiple responses to said text question, ask said respondent to select a best response of said multiple responses to said text question, and, generate an evaluation of said best response.

11. The artificial intelligence system that generates questions and evaluates oral readings and responses of claim 1, wherein said question-and-answer session is limited to a single respondent, such that said artificial intelligence engine conducts an oral dialog exclusively with said respondent without requiring multiple participants or a moderator.

12. The artificial intelligence system that generates questions and evaluates oral readings and responses of claim 11, wherein said respondent is identified using a stored voice fingerprint prior to initiation of the question-and-answer session.

13. The artificial intelligence system that generates questions and evaluates oral readings and responses of claim 1, wherein said artificial intelligence engine is further configured to permit said respondent to provide multiple oral responses to a given text question.

14. The artificial intelligence system that generates questions and evaluates oral readings and responses of claim 13, wherein said artificial intelligence engine prompts said respondent to select a best response among said multiple oral responses and generates said evaluation based only on said best response.

15. The artificial intelligence system that generates questions and evaluates oral readings and responses of claim 13, wherein said artificial intelligence engine stores all responses in a database and produces a composite evaluation incorporating iterative improvements across said responses.

16. The artificial intelligence system that generates questions and evaluates oral readings and responses of claim 1, wherein said artificial intelligence engine is further configured to record in a database: each text question; each oral response; each evaluation; and a measure of elapsed time between delivery of the each text question and receipt of the each oral response.

17. The artificial intelligence system that generates questions and evaluates oral readings and responses of claim 16, wherein said database is configured to enable forensic assessment of authenticity of responses and longitudinal tracking of learning outcomes.

18. The artificial intelligence system that generates questions and evaluates oral readings and responses of claim 1, wherein said artificial intelligence engine is configured to generate oral questions in a manner that prevents substitution of responses generated by external generative AI systems, thereby authenticating that said responses originate from said respondent.

19. The artificial intelligence system that generates questions and evaluates oral readings and responses of claim 18, wherein said session information comprises explicit contrast with text-based discussion questions, whereby oral articulation requirements provide resistance to AI-assisted plagiarism or substitution.

20. The artificial intelligence system that generates questions and evaluates oral readings and responses of claim 1, wherein said artificial intelligence engine stores and compares voice biometrics of said respondent across multiple sessions to verify identity.

21. The artificial intelligence system that generates questions and evaluates oral readings and responses of claim 20, wherein said voice biometrics is utilized to detect potential AI-generated voice substitution or deepfake audio during said question-and-answer session.

22. The artificial intelligence system that generates questions and evaluates oral readings and responses of claim 21, wherein said artificial intelligence engine enables forensic analysis comprises detecting anomalous articulation patterns inconsistent with previously stored voiceprints of said respondent.

23. The artificial intelligence system that generates questions and evaluates oral readings and responses of claim 22, wherein said forensic analysis further comprises detecting a reading level of said respondent and adjusting a difficulty level of said text question.

* * * * *